(12) United States Patent
Vandeweerd

(10) Patent No.: US 7,401,333 B2
(45) Date of Patent: Jul. 15, 2008

(54) ARRAY OF PARALLEL PROGRAMMABLE PROCESSING ENGINES AND DETERMINISTIC METHOD OF OPERATING THE SAME

(75) Inventor: Ivo Vandeweerd, Hasseit (BE)

(73) Assignee: TranSwitch Corporation, Shelton, CT (US)

( * ) Notice: Subject to any disclaimer, the term of this patent is extended or adjusted under 35 U.S.C. 154(b) by 1063 days.

(21) Appl. No.: 10/344,020

(22) PCT Filed: Aug. 8, 2001

(86) PCT No.: PCT/BE01/00134

§ 371 (c)(1), (2), (4) Date: Jun. 6, 2003

(87) PCT Pub. No.: WO02/12999

PCT Pub. Date: Feb. 14, 2002

(65) Prior Publication Data

US 2004/0006584 A1    Jan. 8, 2004

(51) Int. Cl.
*G06F 9/46* (2006.01)
(52) U.S. Cl. .......................... 718/102; 712/16; 712/20; 712/28; 712/30; 712/36
(58) Field of Classification Search ............. 712/1–300; 718/1, 100–108
See application file for complete search history.

(56) References Cited

U.S. PATENT DOCUMENTS 4,414,624 A * 11/1983 Summer et al. ................ 712/21
5,117,490 A * 5/1992 Duxbury et al. ............. 712/218

(Continued)

FOREIGN PATENT DOCUMENTS

WO    PCT/US00/00853    1/2000

OTHER PUBLICATIONS

"Multithreaded Systolic/SIMD DSP Array Processor-MUS2DAP"by Sernec, R. et al., 1997 IEEE Workshop on Signal Processing Systems, pp. 448-457, IEEE Publication # XP-002189868, New York, NY, 1997.

(Continued)

*Primary Examiner*—Lewis A. Bullock, Jr.
(74) *Attorney, Agent, or Firm*—Gordon & Jacobson, PC

(57) ABSTRACT

The present invention provides an array of parallel programmable processing engines interconnected by a switching network. At least some of the processing engines execute a thread, and at least some threads communicate with each other through communication objects either internally within one processing engine or through the network. A scheduling step of the parallel programmable processing engines is initiated by one or more events, an event being defined by a change of a state variable of a communication object. The array comprises:

means for scheduling a scheduling step of the processing engines, the scheduling means comprising means for executing at least a first set of threads in parallel, means for updating state values of communications objects in response to the parallel executing step, and means for repeatedly and sequentially scheduling the executing means and the updating means until no more events occur.

The present invention also provides a deterministic method of operating such an array.

15 Claims, 20 Drawing Sheets

U.S. PATENT DOCUMENTS 5,241,635 A * 8/1993 Papadopoulos et al. ..... 712/201
5,524,250 A * 6/1996 Chesson et al. ............. 712/228
5,655,096 A * 8/1997 Branigin ..................... 712/200
6,154,763 A * 11/2000 Thijssen ..................... 718/102
7,240,175 B1 * 7/2007 Maitland et al. ............ 711/167

OTHER PUBLICATIONS

"A Scheduling Method for Synchronous Communication in the Bach Hardware Compiler" by Sakurai, R. et al., 1999 Asia and South Pacific Design Automation Conference, pp. 193-196, vol. 1, IEEE Publication # XP 01032328, Piscataway, NJ, no date.

* cited by examiner

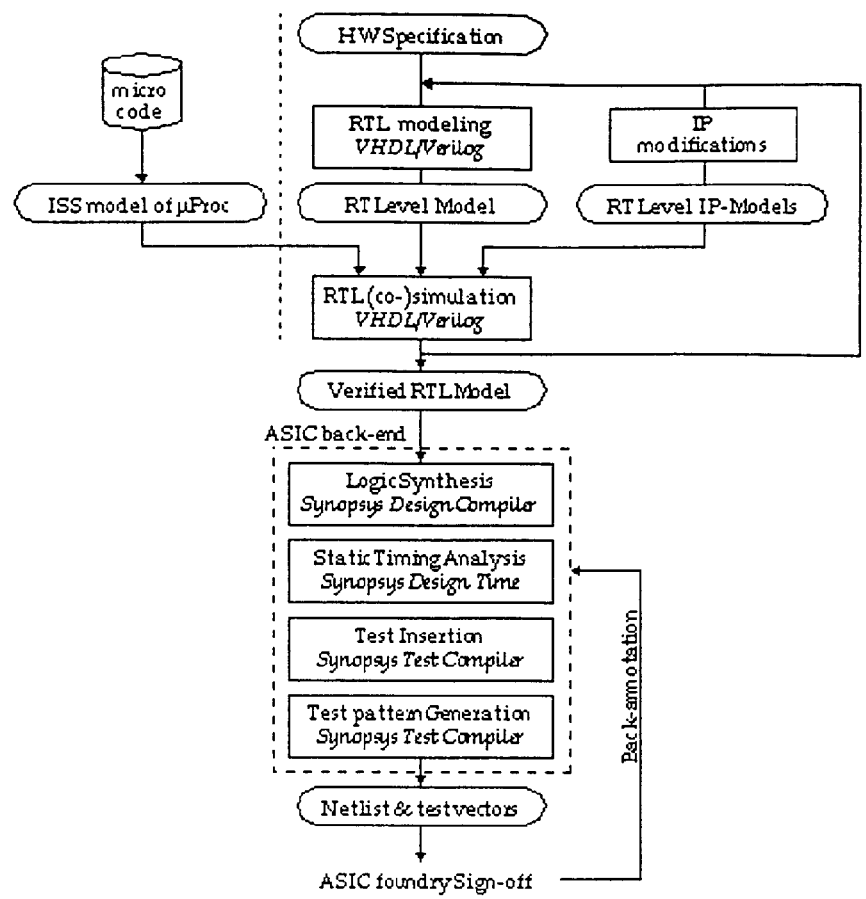
Fig. 1 - Prior Art
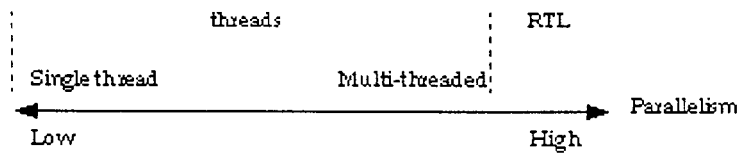
Fig. 2
Fig. 10

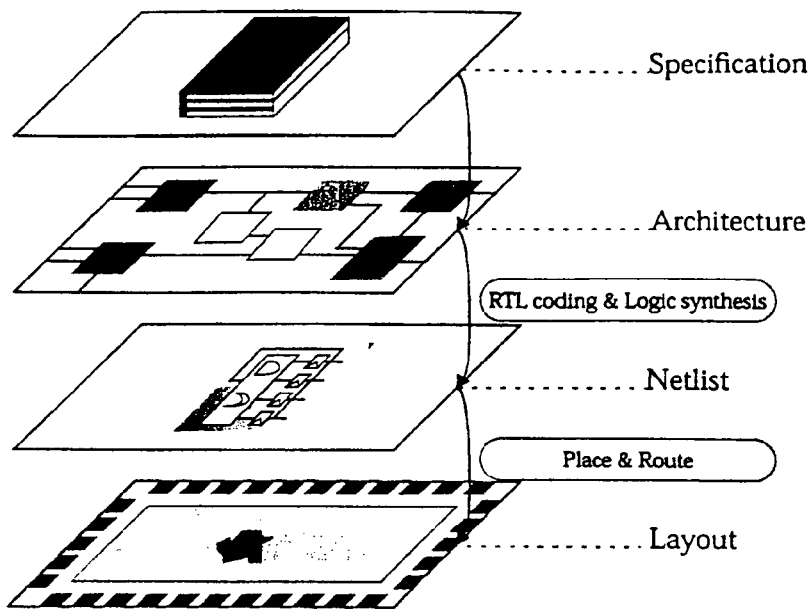
Fig. 3 - Prior Art
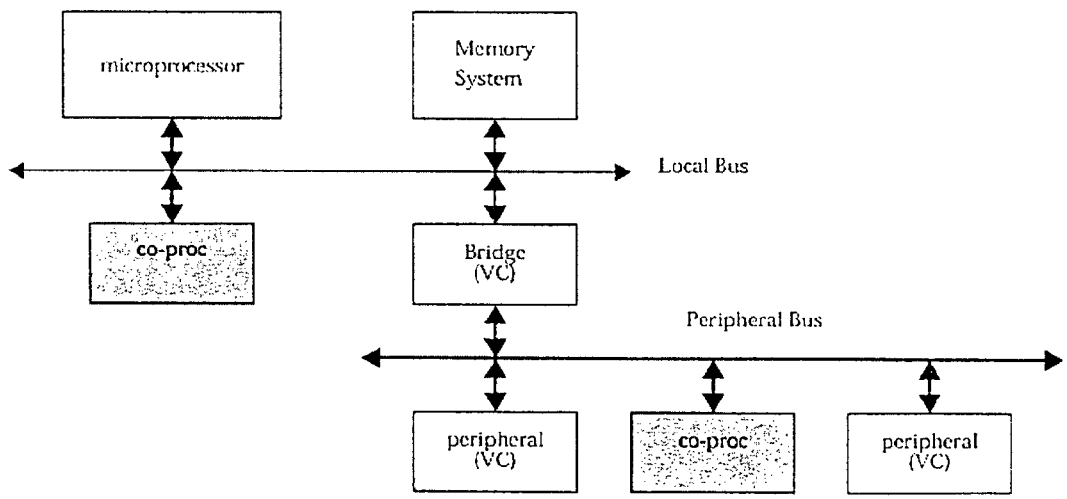
Fig. 4 - Prior Art
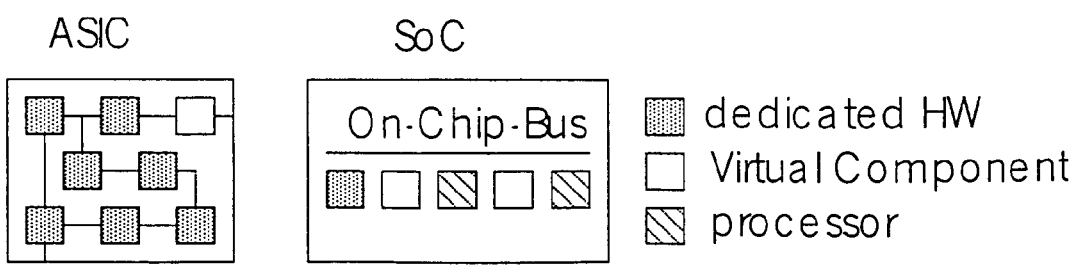
Fig. 11

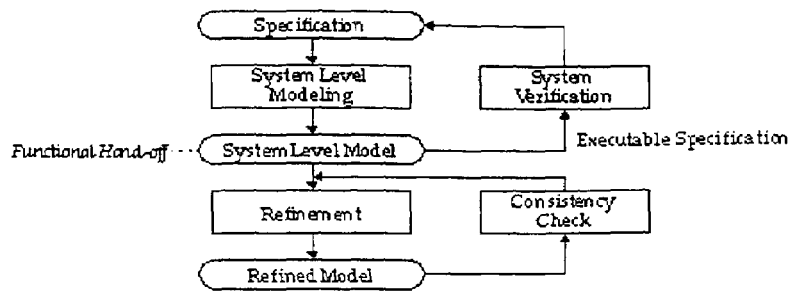
Fig. 7
Temporal precision
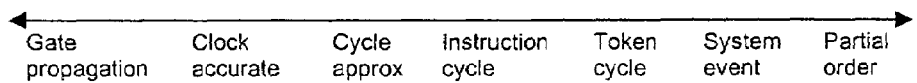
Gate propagation | Clock accurate | Cycle approx | Instruction cycle | Token cycle | System event | Partial order
Data precision
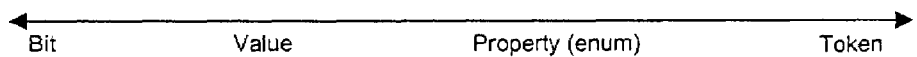
Bit | Value | Property (enum) | Token
Functional precision
Digital logic | RTL | Algorithmic | Mathematical
Fig. 8
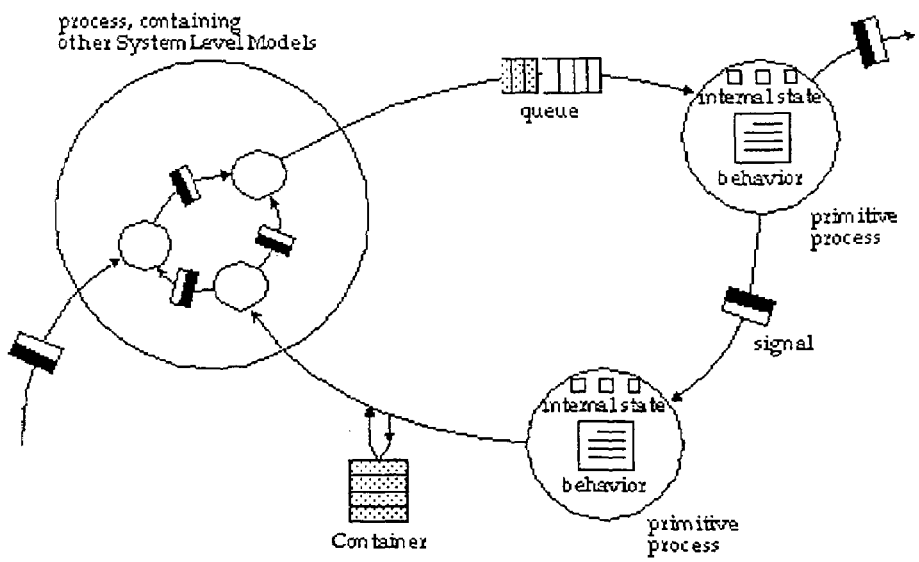
Fig. 9

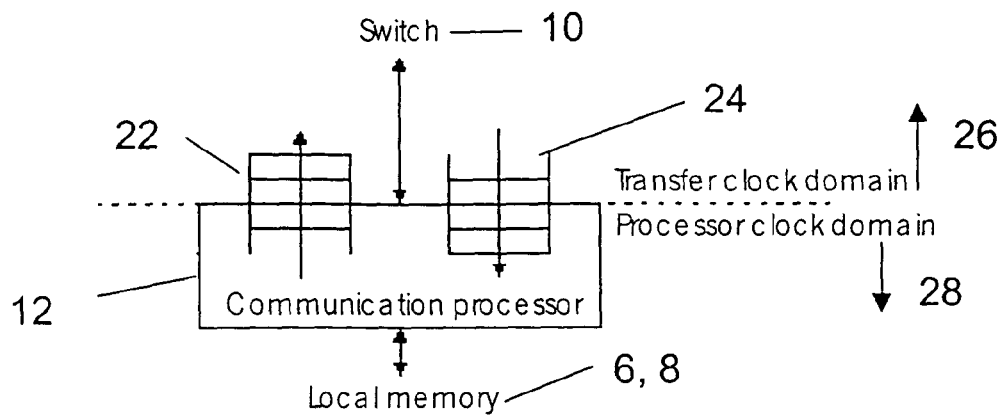
Fig. 22
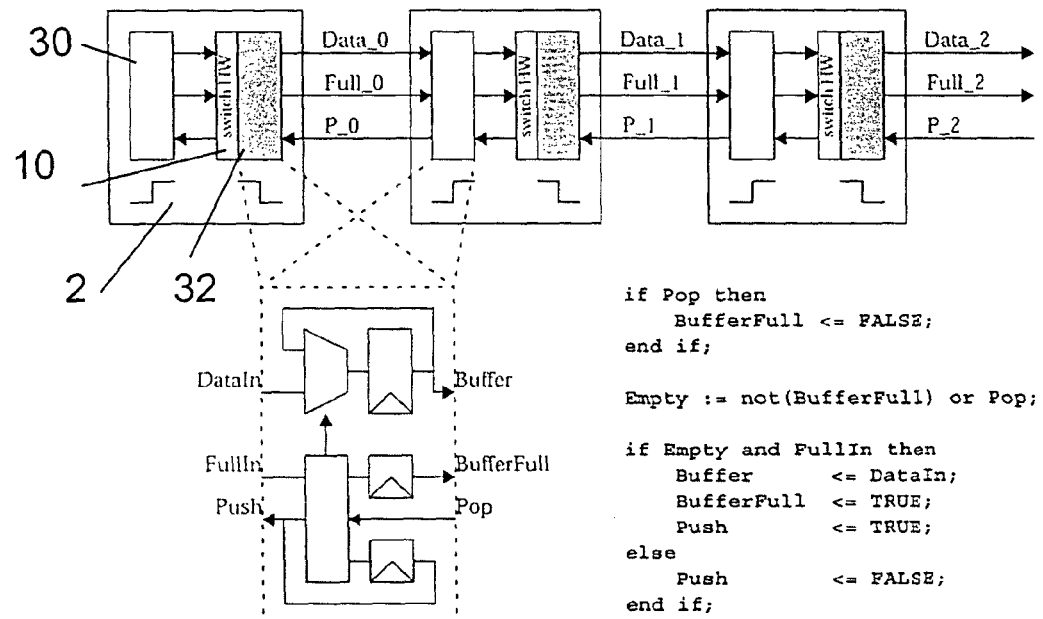
```
if Pop then
    BufferFull <= FALSE;
end if;
Empty := not(BufferFull) or Pop;
if Empty and FullIn then
    Buffer       <= DataIn;
    BufferFull   <= TRUE;
    Push         <= TRUE;
else
    Push         <= FALSE;
end if;
```
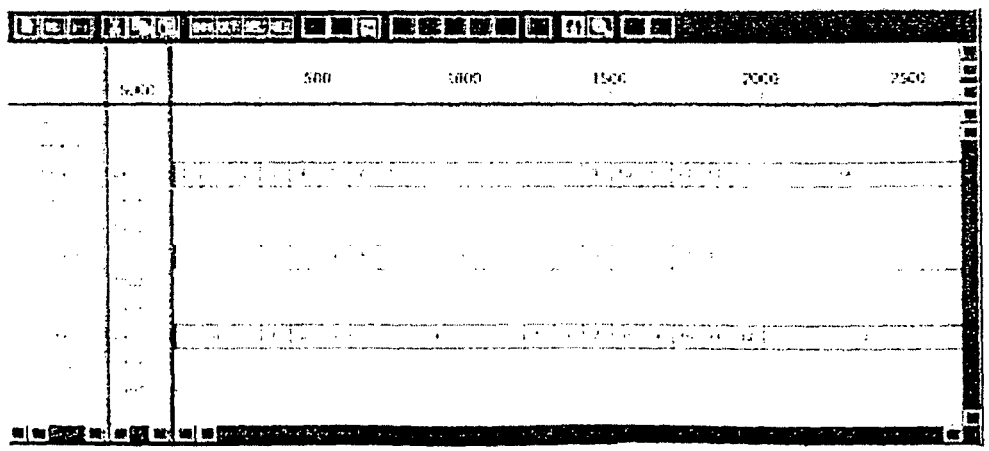
Fig. 23

Average latency

ARRAY OF PARALLEL PROGRAMMABLE PROCESSING ENGINES AND DETERMINISTIC METHOD OF OPERATING THE SAME

TECHNICAL FIELD OF THE INVENTION

The present invention relates to a method of operating an array of parallel programmable processing engines interconnected by a switching network, as well as to such an array of parallel programmable processing engines and software related thereto.

BACKGROUND OF THE INVENTION

The task of an IC (Integrated Circuit) designer is to translate a specification of an integrated circuit into an implementation, such that all requirements are satisfied and all design objectives are optimised.

IC design can also be described more formally as follows. The specification of a system is described in a language $L_{specification}$, which contains the system's functionality, requirements and design objectives. Typically, this language is a combination of plain English, high level programming languages and mathematical formulae. Further a design language $L_{design}$ is provided, primitive design elements of which correspond to existing (or automatically generated) implementations and constructs which correspond to well-defined interactions between design elements. Examples of design languages are Register Transfer Level (RTL) languages like VHDL or Verilog. Some aspects of VHDL are described for instance in "VHDL: coding and logic synthesis with Synopsis", Weng Fook Lee, Academic Press, 2000. A distinctive feature of a design language is that descriptions, written in that language, can be translated by a highly automated design flow into an implementation, e.g. into a netlist. In this sense, VHDL per se does not qualify as a design language, only the synthesizable subset of VHDL does. IC design can thus be defined as the process of describing an implementation, using $L_{design}$, such that this description is consistent with the description of the system specification in $L_{specification}$:

$$L_{design}(\text{implementation}) = L_{specification}(\text{system})$$

The cost of designing is primarily determined by the semantic content of the specification (also referred to as the complexity of the system) and the semantic gap between the specification language $L_{specification}$ and the design language $L_{design}$. Because of the progress in VLSI (Very Large Scale Integration) technology, there are strong economical arguments to integrate more functionality onto a single device. As a result, the semantic content of the specification grows continuously. However, due to the limitations of the designer and design tools, there is a limit to the content of the specification for which the semantic gap can be bridged at reasonable cost. Consequently, if the semantics of the design language remain constant, then progress in VLSI technology will inevitably lead to a design crisis. Design crises have occurred several times and history has shown that the proper response to a design crisis is to increase the semantics of the design language, such that the gap narrows.

Each new design language has led to a reduction of the design cost and enabled a further growth of the complexity of the system that could be designed at reasonable cost.

At present, IC designers are again confronted with a design crisis. The state-of-the-art design methodology is rapidly becoming inadequate to handle the design challenges of Systems-On-Chip (SoC) products. SoC products are integrated circuits dedicated to a specific application, which contain a computing engine (such as a microprocessor core, a DSP core, an MPEG core, etc.), memory and logic on a single chip. SoCs drive the growth of applications such as digital cell phones, digital set-top boxes, video games, DVD players, disk drives, workstations to name but a few.

A current design flow is shown in FIG. 1. A hardware (HW) specification of a system is translated, e.g. using VHDL, into an RT Level model, which is then simulated or co-simulated, e.g. again using VHDL, to verify the functional and structural correctness thereof, so as to obtain a verified RTL model. This verified RTL model is used to generate a netlist, which contains all devices, analysis commands and options, and test vectors, which are used by an ASIC foundry to create an ASIC. Measurements can then be carried out on the implemented ASICs, and if errors are noticed, a device re-spin has to be done.

The shortcomings of the current design flow are the following:

The design productivity of an RTL based design flow incurs unacceptable design cost and time-to-market. For example, present state-of-the-art VLSI technology (e.g. TSMC 0.18μ) has an integration density of 80,000 gates/mm$^2$. A die of 100 mm$^2$ has a capacity of 8 million gates. Even if it is assumed that the design productivity is 1000 gates/person-day (which is very competitive), the design would require 8000 person-days or more than 36 man-years.

Simulations at the RT level are too slow for adequate, pre-manufacturing verification. The number of cycles that can be simulated per second (the simulation speed) decreases because the system complexity increases the amount of computations per cycle. In addition, the number of cycles that must be simulated for sufficient verification coverage also increases because of the increased system complexity. These two factors make it virtually impossible to achieve first-time-right designs with an RTL based approach to SoC design, leading to expensive and time consuming device re-spins.

To boost the design productivity, previously designed units need to be reused. However, reuse of design units is seldom possible as is. Often modifications are required (e.g. because of clocking or test schemes, because the architecture is not appropriate for the latest VLSI technology, because the interface has to be modified, etc.), implying that the complete verification has to be repeated.

SoC architectures are increasingly dominated by RISC (Reduced instruction Set Computer) and DSP (Digital Signal Processor) cores, with embedded software representing perhaps 50-90% of the functionality. However, the RTL-based design flow does not address this issue. Hardware and software developments are decoupled activities. The only link is a co-simulation of the software at the Instruction Set Simulation (ISS) level and the hardware at the RT Level. Both levels are too low to enable the simulation speed required for sufficient verification coverage.

Logic synthesis performs netlist optimisations based on area and performance estimates of design options. However, with deep sub-micron technologies, these estimates are becoming less accurate because the actual performance depends to a large extent on the detailed placement and routing, which is not yet available during synthesis. This means that the actual performance after placement and routing can differ substantially from the estimates made by logic synthesis. A large number of synthesis/placement & routing iterations may result before an implementation is found that matches the performance requirements.

A design crisis as mentioned above is often attributed to the growing gap between design complexity and design productivity. This is, however, an oversimplification of the problem. The gap between design complexity and design productivity is not the cause of the design crisis, but merely a symptom of the semantic gap between the specification and design language. A solution can be found in raising the semantic level of the design language.

The basic idea in raising the semantic level of the design language is that the use of threads as the primitive design element results in raising the semantic level of $L_{design}$. Threads use a von Neumann computational model: their behavior is described as a sequence of instructions that modify variables. Variables correspond to addresses in memory, according to a mapping defined by a compiler. A thread is a sequence of instructions with a single locus of control; i.e., when executing a single thread only one program counter is required which points to the currently active instruction. Multi-threaded programs have multiple control loci, implying parallelism.

With threads as primitive design elements, the design process is equivalent to the creation of a multi-threaded description that contains sufficient parallelism, such that the specified functionality can be implemented with the required performance at minimal cost.

The semantic level of design languages based on threads is considered higher than the level of RTL design languages for the following reasons:

Firstly, the primitive design element of RTL languages, such as VHDL or Verilog, is a clocked process. A clocked process describes the behavior as a sequence of instructions that modify signals. Signals correspond to registers. The signals contain the state of the system. As the size of the system grows, its state grows. With current VLSI technology, large amounts of state are preferably stored in memory and not in registers. RTL languages are not well suited to describe operations on a state that is stored in memory. Because of its computational model, threads are better suited. For example, adding two variables can be done with a single instruction. An RTL description requires therefore a Finite-State Machine (FSM) that first fetches the operands, performs the addition and then stores the result in a memory.

Secondly, threads are better suited to control the parallelism of a design. RTL descriptions imply maximal parallel implementation. For example, the statements if (Clk'event and Clk='1') then $c <= a+b;$ $f <= d+e;$ end if;

inside a clocked process, imply 2 additions executing in parallel. This property makes it difficult to trade performance for cost. Suppose results c and f are not required simultaneously (e.g. because they are stored in a memory), a single adder would be sufficient to implement the equations above. However, this is not easily described in RTL design languages. Threads do not imply maximal parallelism. For example, the statements:

thread_1:

$c=a+b;$ $f=d+e;$ mean that first c is calculated and then f. Since there are no data dependencies, the compiler may decide to execute these statements in parallel anyway (e.g. by using an Arithmetic Logic Unit (ALU) and an Address Calculation Unit (ACU)). A thread does not imply parallelism, but may still contain fine-grain parallelism that can be exploited by a clever compiler. Moreover, a designer can create parallelism by forking a single thread into multiple threads.

thread_1:

$c=a+b;$ thread_2:

$f=d+e;$

Depending on the performance requirements, the compiler may decide to execute the threads in parallel on two separate CPUs (Central Processing Units), or concurrently, on a single CPU one thread after the other.

So, while RTL descriptions imply parallelism, multi-threaded descriptions contain parallelism that can be, but must not be, exploited by the compiler. Multi-threaded descriptions are therefore to a large extent architecture independent, while RT level descriptions are not.

Thirdly, the on-chip performance outpaces the off-chip performance. For example, in 1989, the Intel 486 was clocked at 25 MHz and in 1995, the Intel Pentium Pro was clocked at 150 MHz, while the performance of PCB (Printed Circuit Board) technology basically remained unchanged. Although off-chip bandwidth can be bought (by increasing the number of pins), external data access latency will eventually become the bottleneck. This means that eventually the multiplexing factor of hardware unit can increase. RTL languages do not handle this type of reduced parallelism very well.

RTL languages are well suited for descriptions of implementations with maximal parallelism, while multi-threaded descriptions cover the remaining part of the spectrum, as shown in FIG. 2. In this respect, both languages are complementary. Systems with high bandwidth requirements are likely to use both. Front-end processing is preferably described with RTL, while the remaining functionality can be described with threads. As VLSI technology improves, functions will gradually shift from right to left in FIG. 2: threads can be merged because the processors get faster and RTL functions can be moved to threads. In that respect, multi-threaded descriptions move the design process completely into the software domain for all but very high speed front-end processing.

Traditional approaches to ASIC (Application Specific Integrated Circuit) architecture are based on dedicated hardware, connected through dedicated busses. The dedicated hardware is implemented as a set of registers, with combinational logic in between, as shown in FIG. 3. A hardware specification is converted into an architecture. This architecture is translated, by RTL coding and logic synthesis, into a netlist. The netlist is then converted, by place and route algorithms, into a layout configuration. The advantages of this architecture are:

It achieves high performance at low silicon cost because dedicated solutions tend to be more efficient than non-dedicated ones.

It offers excellent product differentiation.

RTL descriptions can be mapped on this architecture by means of logic synthesis.

However, the traditional approach suffers from high design cost and long time-to-market, resulting from the design of application specific solutions. For example, the use of dedicated busses tends to create routing problems that complicate the deep-sub-micron ASIC back-end design flow. Moreover, the architecture lacks flexibility to deal with design or specification errors, changing product requirements due to market dynamics or standard upgrades. Product re-spins are required to compensate for this lack of flexibility. However, re-spins are becoming less and less attractive because of increasing costs of masks, because they absorb scarce design resources and because they introduce slips in the development schedule that could delay product roll-out beyond the market opportunity window.

An interconnection network based on busses, such as the one shown in FIG. 4 requires the use of a shared medium for exchanging messages and has several drawbacks:

A network based on a single shared medium does not scale well with the number of clients because the shared medium saturates and becomes the bottleneck when new clients are added.

Long busses create several technological problems, such as excessive capacitive load which are a potential source of ramp-time errors, spreading of the clock skew problem over the entire chip. These problems are expected to become even worse in deep sub-micron VLSI technology.

With deep sub-micron technology, the main source of delay is interconnection delay. Long busses will be the main source of performance degradation. The wire delay can be approximated by:

$$tw = RdCw + (RwCw)/2$$

where Cw is the wire capacitance, Rw is the wire resistance. This model is quite accurate if the time of flight along the wire is smaller than the signal rise time. Taking $v_{Alu}=10^8$ cm/s, the time of flight is given by $t_f=0.1$ ns. This is still below the rise times of the buffers that drive large busses. Note that the wire delay scales with $l^2_{wire}$; therefore, long busses are not recommended. Moreover, consider ideal scaling of CMOS dimensions with a factor S; i.e. all horizontal and vertical dimensions are reduced by the same factor, while keeping the electrical field strength constant. The latter implies that the power supply voltage must also be reduced with the same factor. Under ideal scaling, the product $R_wC_w$ for global wires increases with $S^2$. On the other hand, gate delays decrease with 1/S. Therefore, wire delays become dominant. Consequently, a high performance architecture must not use long lines.

There is a need for a new architecture that:

offers flexibility to deal with errors and changing requirements, without expensive re-spins.

offers an acceptable price/performance ratio.

can be customised to offer product differentiation.

is a convenient target for mapping multi-threaded descriptions.

SUMMARY OF THE INVENTION

It is an object of the present invention to provide an architecture, which fulfills at least some of the above requirements.

In particular, it is an object of the present invention to provide a design environment such that multi-threaded descriptions qualify as a design language. Preferably, a highly automated design flow exists that translates these descriptions into an implementation. The CAD tools, the target architecture and methods of the present invention do exactly this. They permit a straightforward implementation of multi-threaded descriptions, much in the same way as a schematic can be implemented in a straightforward manner in standard cells or a gate array.

The present invention provides an architecture, which is called a Custom Programmable Processor Array (CPPA). CPPA can be a single chip implementation of a network comprising a number, preferably a large number of nodes interconnected by a switching network, or it may be a computer system comprising a number, preferably a large number of separate processors interconnected by a switching network. The network may be comprised of parallel programmable processing engines (PE), preferably small RISC PEs, interconnected by the switching network, which is preferably a high-speed switching network. At least some of the processing engines execute a thread, and at least some threads are communicating with each other through communication objects either internally within one processing engine, or via the network. A scheduling step of the parallel programmable processing engines is initiated by one or more events, an event being defined by a change of a state variable of a communication object. A scheduling step comprises a first step wherein the parallel processing engines are scheduled so that at least a first set of threads is executed in parallel, and then a second step wherein state values of communication objects are updated, and a third step wherein, if an event occurs in the first or the second step, the first and the second steps are repeated until no more events occur.

An array of parallel programmable processing engines (PEs) interconnected by a switching network is also provided, where at least some of the processing engines execute a thread, and at least some threads communicate with each other through communication objects either internally within one processing engine or through the network. A scheduling step of the parallel processing engines is initiated by one or more events, an event being defined by a change of state variable of a communication object. The array comprises:

means for scheduling a scheduling step of the processing engines, the scheduling means comprising means for executing at least a first set of threads in parallel, means for updating state values of communication objects in response to the parallel executing step, and means for repeatedly and sequentially scheduling the executing means and the updating means until no more events occur.

Each PE preferably has multi-threading capabilities, which makes an efficient implementation of multi-threading descriptions possible. Moreover, the architecture of each PE can preferably tuned for application specific extensions, which makes it possible to exploit the fine-grain parallelism (if necessary) by adding functional units that implement dedicated instructions (e.g. cyclic redundancy checks). The functional units may be themselves programmable. For instance they may be formed of digital programmable logic elements such as PALs (Programmable Array Logic), PLAs (Programmable Logic Array), PGAs (Programmable Gate Array) and in particular FPGAs (Field Programmable Gate Array). The switching network may employ various types of routing, e.g. wormhole routing and can achieve a communication bandwidth very close to a network of dedicated busses, without the drawbacks of a multiple bus network.

Preferably, the programmable PEs have at least one memory and the communication objects comprise a data structure of a mapping into memory of at least one of signals, containers and queues. A queue may be implemented as a FIFO memory.

Preferably, the set of threads executed in parallel comprises those threads that are sensitive to the event initiating the scheduling step.

Preferably, the array of parallel programmable PEs executes a system level model comprising a plurality of concurrent processes, at least some of which communicate with each other. Each process is a primitive process or a further system level model, and executing a thread on one of the PEs of the array of parallel programmable PEs executes a primitive process.

The array according to the present invention may furthermore comprise a data structure in memory of the state values of the communication objects stored in memory for a number of scheduling steps.

The system level model may be a model of a physical process.

The CPPA architecture of the present invention has many advantages:

It is programmable. Therefore, it offers flexibility to deal with errors and changing requirements, without expensive re-spins.

It offers an acceptable price/performance ratio. The cost of each PE is comparable to complex dedicated Finite State Machines found in the traditional architecture, while the performance is boosted by means of dedicated instructions.

It can be customized to offer product differentiation. Each PE can have dedicated instructions.

It is a convenient target for mapping multi-threaded descriptions, much in the same way as a standard cell implementation is a convenient target for gate level netlist. A thread performs a specific function, as does a gate in a standard cell methodology. The allocation of the thread on one of the PEs is similar to the placement of a gate on the die. Routing of a signal between gates is analogous to the routing of a message between threads through the switching network. A gate requires a number of nanoseconds (or picoseconds) to complete its function, while a thread needs a number of clock cycles. Critical paths through gates determine the overall performance. The same is true for critical paths through threads. By means of the multi-threaded description, the designer has control over the coarse-grain parallelism to make a trade-off between performance and cost.

CPPA may be described as a Multiple Instruction stream Multiple Data stream (MIMD) architecture. MIMD machines have a number of processors that function asynchronously and independently. At any time, different processors may be executing different instructions on different pieces of data. MIMD architectures may be used in a number of application areas such as computer-aided design/computer-aided manufacturing, simulation, modeling, and as communication switches. MIMD architectures have not been very successful so far, mainly because of two reasons. First, VLSI technology did not permit to integrate multiple nodes on a single chip, leading to poor inter-node communication. Second, the fraction of general-purpose code that can be paralleled is limited. The speed-up (i.e. the efficiency) of an MIMD architecture is described by Amdahl's law:

$$\text{Speedup} = \frac{1}{f(par)/(Np) + 1 - fpar}$$

where fpar is the fraction of the code which can be paralleled, and Np is the number of nodes.

CPPA does not suffer from these problems:

With progress of VLSI technology and the use of small RISC architectures many nodes in accordance with the present invention can be integrated in a single chip. This creates the potential for extremely efficient inter-node communication, using the network techniques described in the present invention.

System descriptions are fundamentally different from general purpose software code, because systems inherently contain much parallelism. It is therefore expected that the number of threads exceeds the number of nodes. The speed-up will therefore be very close to the number of nodes, especially since the communication overhead is practically eliminated.

In many cases, an architecture based on dedicated hardware can be better in terms of performance, area and power consumption, just like a full custom design is potentially often better than a standard cell design. Each increase in semantic level of the design language has its price. In accordance with an aspect of the present invention, this price is paid in the cheapest currency: silicon.

The present invention also provides a deterministic method of operating an array of parallel programmable processing engines interconnected by a switching network, at least some of the processing engines executing a thread, and at least some threads communicating with each other through communication objects either internally within one processing engine or through the network. A scheduling step of the parallel programmable processing engines is initiated by one or more events, an event being defined by a change of a state variable of a communication object. A scheduling step comprises: a first step wherein the parallel processing engines are scheduled so that at least a first set of threads are executed in parallel, then a second step wherein state values of communications objects are updated, and a third step wherein, if an event occurs in the first and second steps, the first and second steps are repeated until no more events occur.

The threads may communicate with each other through signals and/or queues and/or containers.

When the programmable processing engines have at least one memory, the method may further comprise a step of a mapping into memory an object selected as at least one of signals, containers and queues.

The set of threads executed in parallel may comprise those threads that are sensitive to the event initiating the scheduling step.

Also a method is provided wherein the array of parallel programmable processing engines executes a system level model, the system level model comprising a plurality of concurrent processes at least some of which communicate with each other, each process being a primitive process or a further system level model. Executing a thread on one of the array of parallel programmable processing engines executes a primitive process.

The state values of the communication objects may be stored in memory for a number of scheduling steps.

The system level model may be a model of a physical process.

The present invention furthermore provides a computer program product directly loadable into an internal memory of a digital computer, comprising software code portions for performing the steps of any of the methods according to the present invention when said computer program product is run on a computer.

The present invention also provides a computer program product stored on a computer usable medium, comprising: computer readable program means for controlling execution of an array of parallel programmable processing engines according to the present invention.

The present invention also provides a computer program product stored on a computer usable medium, comprising: computer readable program means for controlling execution of threads on an array of parallel processing engines according to a method of the present invention.

It is important that a computer program product in accordance with the present invention is capable of being distributed as a program product in a variety of forms, and that the present invention applies equally regardless of the particular type of signal bearing media used to actually carry out the distribution. Examples of computer readable signal bearing media include: recordable type media such as floppy disks, CD ROMs, optical disks, solid state memory and transmission type media such as digital and analogue communication links.

The present invention also includes a method for configuring an array of parallel programmable processing engines interconnected by a switching network, the array being adapted for delta cycle convergence, the configuration step comprising: transmitting from a near location a representation of a process to be run on the array to a remote location where a further processing engine carries out any of the methods in accordance with the present invention, and receiving at a near location a configuration file for the array.

In the above method, at least some of the processing engines may execute a thread, at least some threads may communicate with each other through communication objects either internally within one processing engine or through the network, a scheduling step of the parallel programmable processing engines may be initiated by one or more events, an event being defined by a change of a state variable of a communication object. In that case, the delta cycle convergence step may comprise:

step 1. the parallel processing engines being scheduled so that at least a first set of threads are executed in parallel, and step 2. then state values of communication objects are updated, step 3. if an event occurs in steps 1 and 2, steps 1 and 2 are repeated until no more events occur, The above method may further comprising the step of loading the configuration file onto an array of processors.

The present invention also comprises a device for configuring an array of parallel programmable processing engines interconnected by a switching network, at least some of the processing engines executing a thread and at least some threads communicating with each other through communication objects either internally within one processing engine or through the network. The configuring device comprises input means for inputting a set of computer program instructions, an interface for interfacing with the array of parallel programmable processing engines, and means for configuring the array of parallel programmable processing engines to carry out a scheduling step. A scheduling step of the parallel programmable processing engines is initiated by one or more events, an event being defined by a change of a state variable of a communication object. A scheduling step comprises: a first step wherein the parallel processing engines are scheduled so that at least a first set of threads are executed in parallel, then a second step wherein state values of communication objects are updated, and a third step wherein, if an event occurs in the first and second steps, the first and second steps are repeated until no more events occur.

The input means of the configuration device may comprise at least one of a keyboard, a CD-ROM reader or an internet connection for inputting the set of computer program instructions, after which they can be downloaded into the array of processing engines.

The present invention also comprises a compiler for receiving a high level description of a computer program and for generating a compiled file for loading onto an array of parallel programmable processing engines interconnected by a switching network, wherein the compiler generates the configuration file such that when configured the array executes a delta cycle convergence step.

A method of receiving a high level description of a computer program and generating a compiled file for loading onto an array of parallel programmable processing engines interconnected by a switching network is also provided, the method comprising generating the configuration file such that when configured the array executes a delta cycle convergence step.

The present invention furthermore comprises a processing node for use in an array of parallel programmable processing elements interconnected by a switching network, the processing node comprising a processing element, a memory and a communication interface for communicating with other processing nodes in the switching network, the processing node being adapted for delta cycle convergence.

The adaptation for delta cycle convergence may for example be a software program running on the processing element, a hardware scheduling unit, or it may comprise an operating system for the processing engine adapted for carrying out delta cycle convergence, e.g. by interrupting the working of the processing element until the delta cycle conversion is over, or by having the processing element to wait until the delta cycle conversion is over.

These and other objects and features of the present invention will become better understood through a consideration of the following description taken in conjunction with the drawings, which illustrate, by way of example, the principles of the invention.

BRIEF DESCRIPTION OF THE DRAWINGS

FIG. 1 shows a current IC design flow.

FIG. 2 illustrates a division between RTL languages and multi-threaded descriptions in function of parallelism.

FIG. 3 shows a traditional ASIC architecture.

FIG. 4 is an implementation of an interconnection network according to the prior art using buses.

FIG. 7 illustrates the two-fold purpose of system level modeling.

FIG. 8 shows that system level modeling spans a wide range of abstraction levels in the temporal, data value and functional precision axes.

FIG. 9 is a diagrammatic representation of a simulation model for translating concurrency of a system level model into a single thread of execution.

FIG. 10 is an example of communicating, concurrent processes.

FIG. 11 compares (a) the architecture of current ASICs with (b) the architecture of SoCs.

FIG. 22 shows a communication processor as an interface between local and remote storage.

FIG. 23 illustrates the propagation process of a message during wormhole routing.

DESCRIPTION OF THE ILLUSTRATIVE EMBODIMENTS

The present invention will be described with reference to certain embodiments and drawings but the present invention is not limited thereto but only by the claims.

Figure 5:
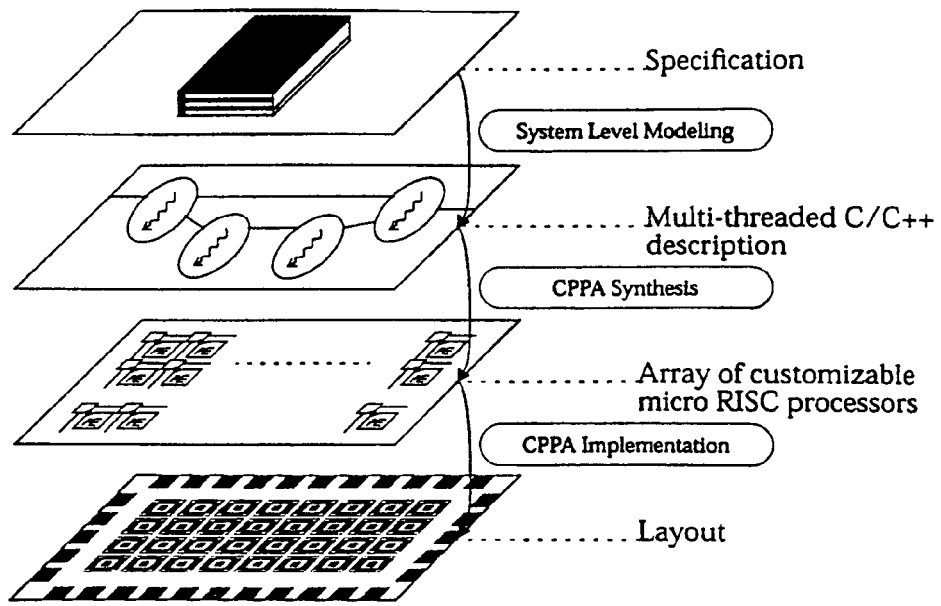
FIG. 5 shows a CPPA architecture according to an embodiment of the present invention.
Figure 6:
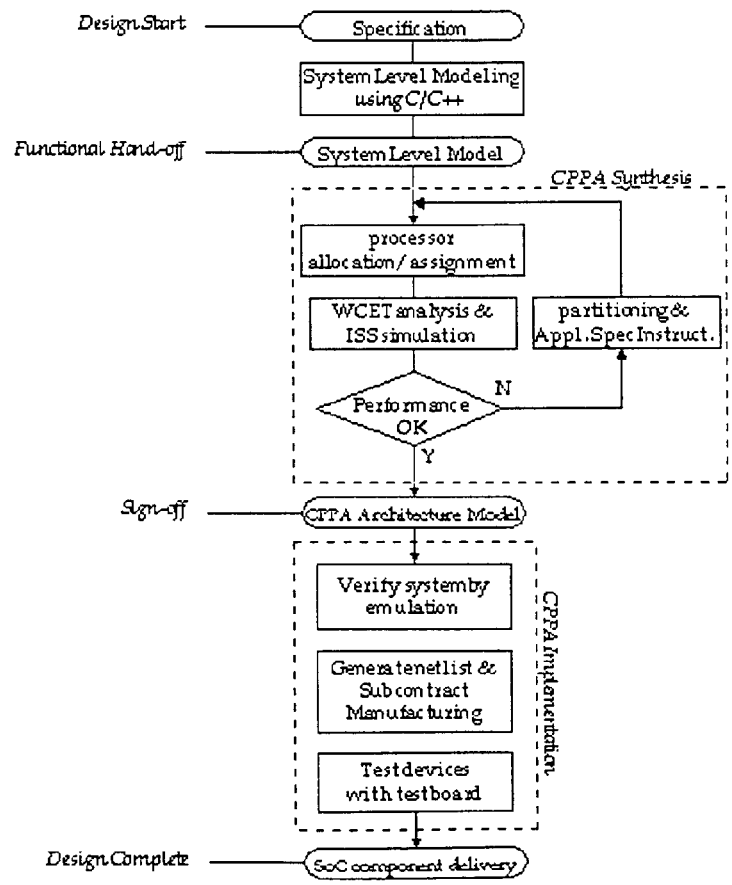
FIG. 6 gives a flow chart of the CPPA architecture of FIG. 5.

A general overview of an architecture according to an embodiment of the present invention is given in FIG. 5, and a flow chart is given in FIG. 6. The design flow contains three phases, which will each be explained in more detail later:

system level modeling phase: In this first phase, starting from a specification, a system level model of the device is created, using e.g. C and C++ programming languages. A system level model is an executable specification that describes the behavior of the device. This behavior is verified by means of a system level simulator. Various simulation tools are currently being developed by several companies (E.g. SystemC of Synopsys and Cynlib of Cynapps). Preferably, the CSim tool of C Level Design is used, which is a product is based on simulation technology developed by the applicant of the present invention and described in U.S. patent application Ser. No. 09/588,884 and European Patent Application EP 1 059 593 both of which are incorporated herein by reference. CSim is a discrete event simulator that relies on a C++ class library to model concurrency and hardware oriented data types in a system. Concurrency is based on concepts that are borrowed from VHDL. There is a close resemblance between the threads of a system level model and processes of a VHDL description. The system level modeling phase is concluded by a Functional Hand-off milestone, at which the system level model, together with a set of reference vector files is handed over to the next phase. This can be regarded as a formal agreement with respect to the functionality of the system, but not yet with respect to the performance.

CPPA Synthesis phase: During this phase, the system level model is mapped onto a CPPA architecture model in accordance with an embodiment of the present invention. The goal of this phase is to determine how many processor elements are required (processor allocation) and how the threads are distributed over the processor elements (processor assignment), such that the performance/cost ratio is optimized. Worst Case Execution Time (WCET) algorithms and Instruction Set Simulation (ISS) techniques are used to determine the performance of the architecture. If the performance requirements are not met, several techniques can be used: improvement: allocation of more processors, improvement of the processor assignment, increasing the parallelism in the system level model by forking threads into several sub-threads and adding application specific instructions to the processor's instruction set. Once an acceptable solution is found, the CPPA synthesis phase is concluded by a Sign-off step, at which an ISS simulation run validates both the performance and functionality. At this point in time, it can be guaranteed that the SoC component will properly execute the set of reference vector files within the given performance constraints.

CPPA Implementation phase: During the implementation phase, the CPPA architecture model is transformed into a testable netlist. The netlist is verified with a CPPA emulator. Emulation is considered necessary to provide the required simulation speed for checking consistency between the system level simulation results and the gate level simulation results.

In what follows, each of the key technology components of the above design flow are further elaborated.

System Level Modeling

System Level Modeling is a process of capturing the behavior of a system in the form of a collection of concurrent threads, e.g. C/C++ threads. The purpose of System Level Modeling is twofold, as also shown in FIG. 7:

creating an executable specification, and
creating a reference implementation for refinement.

The terminology that is used in the field of system design is to the inventor's knowledge not yet widely spread. Confusion still exists around the exact definition of terms like system, functional description, behavioral description, etc. Some organizations use common modeling terms with divergent meanings, while others use different words to describe the same type of model. To remove some of the ambiguity, the System Level Design development working group of the VSIA (Virtual Socket Interface Alliance) developed a systematic basis for defining model types. In the present description the terminology described in their model taxonomy document, "VSI System Level Design Model Taxonomy", VSI Reference Document, Version 1.0, 25 Oct. 1998 is adhered to. According to this document there are several types of system models: executable specifications, mathematical-equation models and algorithm models.

In the context of the present invention, only the executable specification system models are considered. When referring to a system level model, an executable specification is actually meant, as defined by the VSIA: "An executable specification is a behavioral description of a component or system object that reflects the particular function and timing of the intended design as seen from the object's interface when executed in a computer simulation. Executable specifications describe the behavior at the highest level of abstraction that still provides the proper data transformations (correct data in yields correct data out; DEFINED bad data in has the SPECIFIED output results)."

An executable specification does not contain any implementation information. The key issue in this definition is the "at the highest level of abstraction" aspect. The level of abstraction, or in other words, the resolution of detail, can be situated along three orthogonal axes, as shown in FIG. 8:

temporal precision,
data value precision,
functional precision.

The highest level of abstraction of a system depends on the nature of the system. For example, the temporal precision of a clock generator system is probably nsec, while in an ADSL modem precision at the system event level seems more appropriate. Moreover, a system level model will most likely contain models of sub-systems. Each sub-system is best described at its most convenient level of abstraction. For example, the system's interface is sometimes conveniently described at the RTL level, while its core DSP functionality requires algorithmic descriptions.

A direct consequence of this definition is system level models of complex systems span a wide range of abstraction levels in the temporal, data value and functional precision axes.

Having a system level model has several advantages:

A system level model is the specification of the system in an executable form. This means that the system can be simulated to verify whether the behavior matches the intended behavior. Design errors can be found and corrected very early in the design cycle, avoiding expensive design iterations.

Because all elements of a system level model are described at the highest level of abstraction, the simulations run extremely fast. This means that more simulations can be performed, so that bugs can be found that would have gone unnoticed during RTL simulations.

A system level model defines a reference implementation. By means of simulation, a set of reference vectors can be generated that define the I/O behavior of a system. Other implementations of the system (e.g. at lower levels of abstraction) can be verified by checking their I/O behavior against these reference vectors.

A system level model can be the starting point of a design refinement process. If the appropriate coding styles are applied during the creation of the system level model, large parts of the model's code can easily be refined to a level at which an implementation can be synthesized or compiled. The creation of the system level model is therefore the first step in the translation from $L_{specification}$ (system) to $L_{design}$(implementation), rather than an additional step.

System Level Modeling Language

The choice of a language is probably the most important choice of a system level model. Although other languages are possible, the preferred language is ANSI C++. The choice for C++ as the base language was made because of several practical reasons:

C++ is object oriented (OO). OO programming techniques are to date the most powerful techniques for describing complex systems and have excellent re-use properties because of object encapsulation and inheritance.

C++ is extendable. By adding classes and using operator overloading, concepts can be added that are particularly well suited for a certain application domain. For example, systems that need error detection/correction may benefit from classes that support polynomial arithmetic. Thanks to operator overloading, polynomial arithmetic can be described in a very user-friendly fashion.

Since C and C++ compilers exist for most embedded processors, system level models can be compiled into an implementation on an embedded processor with minimal effort. This makes system level models suited for describing both the hardware and software aspects of a system. Unlike other languages, such as VHDL, the system level model of the software part of a system can, with the proper coding style, be translated directly into micro code. Moreover, with the new generation of C-based synthesis tools, also the hardware part of a system can be translated in synthesizable descriptions.

C and C++ are widely used. System designers are therefore likely to be familiar with C/C++. Moreover, if system level models are already available, they are probably written in C or C++. Vice versa, other system level modeling environments, such as SPW, COSSAP or Felix, provide a C interface which makes it easy to export models to foreign environments.

Excellent development tools, such as a compiler and debugger, are available on all platforms for a reasonable (or even zero) cost.

Compared to other high level languages (e.g. Java, Python or Lisp) C++ programs run fast. Simulation speed is important to achieve the verification goals.

Unfortunately, ANSI C++ lacks several concepts that are necessary to model systems. For example, the notion of time is not defined in standard C++. Therefore a C++ class library needs to be included that provides constructs for system level modeling that are missing in C++:
concurrency and time,
high level communication constructs,
hardware data types.

System Level Modeling and Concurrency

Complex systems contain many concurrent processes with complex interactions between them. A system level model that captures the behavior of such a system will therefore contain concurrency. When executing a system level model on a general purpose computer, which is basically a von Neumann machine that executes a thread of instructions sequentially, the concurrency of the system level model must be translated into a single thread of execution. That is the purpose of the simulation engine. In that respect, the simulation engine can be considered as an operating system that is optimized for massive concurrency.

The simulation engine may be a discrete event simulation engine that uses a computational model as described hereunder. FIG. 9 is a diagrammatic representation of such a simulation model.

A system level model is described as a set of concurrent processes that communicate through signals, queues and/or containers.

A process can contain other system level models or is a primitive process. The behavior of a primitive process is described as a single thread of statements. Executing the behavior of a primitive process is calculating the new output and internal state values, based on the current value of the inputs and the internal state. This process is referred to as evaluation.

A signal is an object with two values: a current value and a new value. During the evaluation, processes read the current values of their input signals and write to the new value of their output signals. Optionally, a signal stores its values at a limited number of previous time steps. This is called the delay line of a signal. The update of a signal is replacing its current value by its new value.

A queue is an object with two FIFO (First in First out) stacks: a main FIFO and an entry FIFO. During the evaluation, processes read from the main FIFO of their input queues and write to the entry FIFO of their output queues. The update of a queue is transferring the entry FIFO to the main FIFO.

A container is an object that is used to transfer a block of data between a producer and a consumer. It contains an array of values and an access lock. During evaluation, the process that has acquired the lock (the producer or the consumer) can access the array of values. The process that has the lock can transfer it to the other party. The update of a container is the actual transfer of the lock.

An event occurs if the new value and the current value of a signal differ or if the state of a queue changes or if the lock of a container is transferred. If an event has occurred, the simulation engine will perform a delta cycle. A delta cycle contains 2 phases. In phase 1, the evaluation phase, all processes are evaluated. In phase 2, the update phase, all signals, queues and containers are updated. This guarantees that the results are independent of the order in which the processes are executed. The simulation engine will continue performing delta cycles until no more events occur. This is called delta cycle convergence.

After delta cycle convergence, the simulation engine updates the delay lines of the signals and advances time to the next point in time at which an event is scheduled. At that point in time delta cycle convergence is performed again. The process of advancing the time and performing delta cycle convergence is repeated until no more events are scheduled.

The simulation engine is similar to the engine used in VHDL simulators. Compared to VHDL simulation engines, however, the simulation engine of the present invention adds a number of features that are important in system level modeling:

Processes can contain other processes. This is important for achieving true hierarchical descriptions. VHDL can only encapsulate state in a component, but a component cannot be instantiated in a process.

Queues are often used in system level models. For example, a Petri net model is based on queues. In a simulation engine according to the present invention, queues are embedded in the environment itself, thereby preserving the property of determinism.

Containers are used in system level models to model DMA (Direct Memory Access) type of communication. In the simulation engine of the present invention, containers are embedded in the environment itself, thereby preserving the property of determinism.

Delay lines are embedded in the simulation engine of the present invention. They are useful for describing the data flow graph models of DSP systems.

Object Oriented Programming can be used.

System Level Modeling and Determinism

Another concept in system level modeling is determinism. Determinism refers to the property that correct implementations of the simulation engine will always produce the same results when simulating a valid executable specification. Although this may seem trivial, many environments (e.g. Verilog, CoWare's N2C, Cynapps' Cynlib) do not have this property. For example, in the simple system shown in FIG. 10, there are 2 concurrent processes, A and B, that communicate.

Process A generates data that is consumed by Process B. A trivial simulation engine may choose to execute first Process A, followed by Process B. However, another engine might choose another order. Without precautions in the communication, this may lead to different results. All these results are probably valid, which makes it difficult for the designer to distinguish good from bad descriptions. Or, even worse, if there is a mismatch between the results of the system model and the implementation, it is difficult for the designer to determine whether the cause is an implementation error or the lack of determinism.

A lack of determinism makes a system level model much less valuable as a reference model, since the refinement of one of the processes into a more detailed set of concurrent subprocesses may alter the order of process execution and therefore alter the results. It then becomes impossible to verify the design refinement by simply comparing its simulation results to the reference results. To support design refinement and the use of system level models as reference model, the property of determinism is very important.

System Level Modeling and Computational Models

A system may contain several components that are very different in nature. For example, a system may contain interface logic that is most conveniently described at the RT level of abstraction, a DSP part that is most conveniently described using a Data Flow Graph model and a control part for which the designer would like to use a Petri net representation. This observation has led many experts to believe that a system level modeling environment should support various languages, each tuned for a specific computational model. The environment of the present invention a different approach is taken: with a single language and a single simulation engine, a wide range of abstraction levels and computational models can be supported in a clear and simple way.

As an example, a system may be constructed in two layers:

An inner layer, containing the core functionality of the model. The use of special class library constructs should be avoided in the inner layer. Only standard C/C++ constructs are used to describe the functionality.

An outer layer, containing the timing/concurrency aspect of the model. The outer layer uses constructs of the simulation engine according to the present invention to specify the timing aspects according to the preferred computational model.

Encapsulation is important, because:

it protects the investment in system level modeling. The core functionality of the IP is described in standard C/C++, without any special class library constructs.

it integrates the simulation engine of the present invention with the existing design flow. With encapsulation, the simulation engine of the present invention can be considered as a layer that is placed on top of system components and allows to perform simulations of these "concurrent" system components. If the simulations are completed, these components can be implemented in various ways: as software on an embedded processor core or an ASIC, or as hardware that is synthesized by means of commercial products like System Compiler from C Level Design or ART builder from Frontier Design.

System level model development usually proceeds as an iteration of the following steps:

Structure definition: define the model's structure (ports, instances, etc.). The structure of a model is defined in a special function, called the constructor. Constructor code may look quite awkward to designers. For that purpose, a tool may be developed that allows the designer to define the structure of a module. The tool will generate the corresponding constructor code.

Defining the model's behavior: write source code that defines the behavior of the model. For this purpose, any preferred text editor can be used, e.g. the C++ mode can be used.

Source code compilation: compiling the source code. The descriptions of the simulation engine according to the present invention can e.g. be compiled by the g++, the GNU C++ compiler. To shield system designers from the details of source code compilation, the development environment may include cma, a makefile generator. This turns source code compilation, possibly including numerous files with complex dependencies, into a trivial task.

Run a simulation. The simulation engine according to the present invention may e.c. support two modes: a command line mode for running simulations in batch mode and an interactive mode, via a GUI/debugger.

Inspect the output result. Output facilities to trace and to plot the values of signals may be provided.

Custom Programmable Processor Array (CPPA)

Aspects of the present invention address problems in the design methodology of ASICs. With the growing importance of Systems-On-Chip the design complexity is increasing exponentially and aspects of the present invention address:

Design reuse: It is generally acknowledged that reusing previously designed units, named Virtual Components (VCs) according to the Virtual Socket Interface Alliance (VSIA) terminology, is an effective method to deal with increasing design complexities.

Programmable instead of dedicated implementations: Design iterations are unavoidable in the development of complex SoCs. Current state-of-the-art verification technology cannot guarantee first time right solutions. A clear advantage of programmable over dedicated implementations is the low cost and ease of design iterations. Programmable solutions lead to a shorter time to market and reduced development cost. Moreover, they can reduce the burden of verification, which weighs heavily on a methodology with expensive design iterations. Also, programmable solutions allow for product upgrades, resulting in increased product lifetime. The main technologies for programmable implementations are Field Programmable Gate Arrays (FPGAs) and embedded microprocessors. FPGAs currently lack the capacity for integrating complete SoCs but the present invention is not limited to FPGAs only being used for the functional units and includes their use as programmable processing engines. Embedded microprocessor cores are available on a much larger scale (e.g. 8051, ARM7TDMI, MIPS, ARC, Tensilica, etc.) and are compatible with ASIC technology. Nowadays, many ASIC vendors offer a library that includes embedded microprocessors. In addition, the programming of a microprocessor by means of a high level language (e.g. C or C++) is well understood by most engineers, while the programming of FPGAs using VHDL and logic synthesis requires specialists. For these reasons, it is expected that SoCs will make extensive use of embedded programmable processor cores.

The above paradigm shift has a major impact on the hardware architecture of a SoC. The architecture of current ASICs is shown in FIG. 11($a$). It is a dedicated interconnection of dedicated hardware. Occasionally, a previously designed component is reused, often after a number of adaptations. Because of design reuse and the integration of embedded microprocessor cores, the architecture of a SoC is fundamentally different. This is illustrated in FIG. 11($b$):

SoCs contain a large amount of Virtual Components (VCs). This is necessary to achieve an acceptable design productivity. The amount of dedicated hardware is limited.

SoCs contain embedded microprocessors. Early SoCs contain only one or a few processors, but this number is expected to grow rapidly.

An essential part of the architecture is a standard scheme for interconnecting the components of the architecture. The interconnection scheme is often referred to as the Standard On-Chip-Bus (OCB). The use of a standard OCB is essential for mixing and matching reusable VCs, because it eliminates the need for glue-logic development and VC redesign when interfacing VCs with each other and with dedicated HW or embedded processors.

Figure 12:
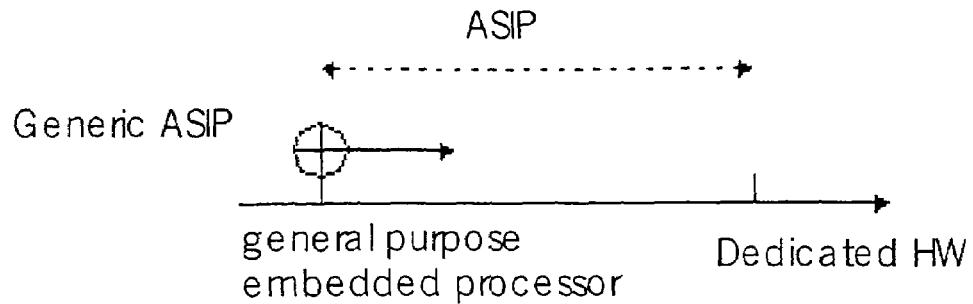
FIG. 12 illustrates that ASIPs cover a range between general purpose processors and dedicated hardware solutions.

The present invention takes this paradigm shift one stage further by introducing the concept of Application Specific Instruction set Processors (ASIPs). This is done based on the recognition that a general-purpose embedded microprocessor and dedicated hardware are actually two instances of an ASIP. In fact, ASIPs cover a range between general-purpose processors and dedicated hardware solutions, as shown in FIG. 12. If the instruction set is very general, the ASIP is equivalent to a general purpose embedded microprocessor. If the ASIP contains only 1 instruction, it reduces to a dedicated hardware solution. Moreover, by adding specialized instructions, the performance of the processor can be enhanced to match the performance of dedicated hardware, but, at the same time, maintain the flexibility of programmable solutions.

Figure 13:
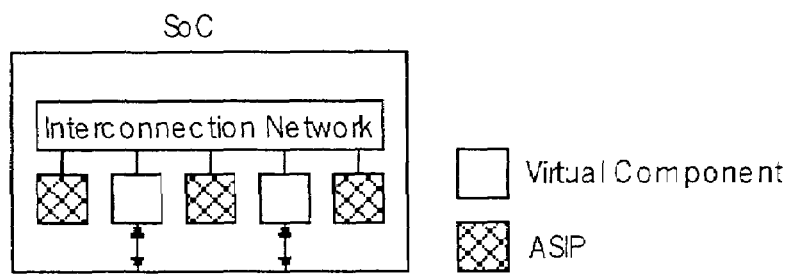
FIG. 13 shows the architecture of SoCs using ASIPs.

The architecture of a SoC of FIG. 11 in this paradigm is simplified to a structure as shown in FIG. 13.

Virtual components implement legacy designs. For example, an ARM core (for more information on ARM see "ARM system-on-chip architecture" second edition, by Steve Furber, Addison-Wesley, 2000) running legacy software or interfaces according to a standard communication protocol (e.g. PCI, USB, Ethernet, etc.). These interface hardware blocks are the perfect candidates for design reuse and hence a growing availability of VCs for a wide range of standard interfaces is expected.

The ASIPs implement the core functionality (complexity) of the device. Parts of the functionality that require intensive processing are mapped on ASIPs with dedicated instruction sets. Parts of the functionality with less demanding requirements are mapped on simple general purpose ASIPs (also called generic ASIPs) or standard embedded processors (e.g. ARM7TDMI).

The advantages of this approach are:

The ease of design iteration because of the absence of dedicated hardware to implement the device's functionality. Implementing a function with an ASIP partitions the design in the development of functional software and the definition/implementation of the instruction set. The functional software is described at a high level e.g. using C (or C++) and compiled into micro-code using a retargetable compiler (see "The nML processor description language", version 1.1 preliminary, Target Compiler Technologies N.V., 1996-1997). The instructions are implemented in hardware. This creates a clean separation between the functionality and the implementation, which is not possible with the traditional design methodology based on RTL languages. Within the constraints of the instruction set, the functional software can be changed after tape out, resulting in fast design iterations. This makes this approach fundamentally different from a design flow based on logic or high level synthesis.

Exhaustive verification is only required for the special instructions hardware. Since the real complexity is located in the software domain, where functional bugs can be changed more easily (even after tape-out), the emphasis on the verification process can be relaxed compared to the traditional design methodology based on RTL languages.

Application specific instructions are a means to differentiate the product, while maintaining programmability. This is extremely important since product differentiation is not trivial if every vendor has access to the same VCs and embedded processor cores.

Since the functionality is described in software, the issue of capturing IP and reuse is lifted from the hardware domain into the software domain. A solution can be tuned for a specific application by changing the instruction set, without the need to modify the functional software. With respect to reuse, this means that all IP can be captured at a high level, without architecture dependent details.

CPPA Architecture

In an SoC architecture in accordance with the present invention, the interconnection network plays an important role. Conventional implementations of the network are similar to the structure shown in FIG. 4. This structure follows the recommendations of VSI and is in line with other busses, e.g. IBM Blue Logic On-Chip Bus and ARM's AMBA bus. The ASIP acts as a slave co-processor and is either connected to the local bus or to the peripheral bus.

This architecture will face serious problems:

The architecture does not scale well. The progress in VLSI technology will permit to implement more parallelism in the architecture. There are basically two ways to increase parallelism: increase the complexity of the processors to exploit instruction level parallelism or increase the number of processors to exploit the thread level parallelism. Like traditional von Neumann processors, the performance of the processors can be increased by means of pipelining, multiple execution units, multi-operation instructions (VLIW architectures) or multiple instruction issuing (superscalar ILP-processors). Exploiting the thread level parallelism is typically realised by a MIMD (Multiple Instruction Multiple Data) architecture. The first option is generally preferred for general purpose processors (e.g. Pentium or PowerPC), because it can run low quality C code written at the lowest possible cost/performance ratio. The only assumption one can make about this C code is that it adheres to the von Neumann computational model and hence sophisticated hardware is used to exploit parallelism in this inherently sequential description. However, systems are inherently concurrent. It is therefore awkward to use a von Neumann computational model to describe a system and then use sophisticated hardware solutions to exploit the parallelism in the sequential von Neumann model. Instead a computational model that captures the concurrent behavior is more appropriate. In that case, an MIMD architecture as used in the present invention is a better implementation since it permits autonomous operations on a set of data by a set of processors without any architectural restrictions. The implementation of the system, described in terms of threads, is therefore basically the allocation of threads on processors. CPPA's in accordance with the present invention are parallel MIMD architectures which can be used with a large number of processing engines, e.g. 16-100 processors.

An architecture based on a single shared medium does not scale well with the number of clients, because the shared medium saturates and adding new clients does not increase the performance.

Long busses create several technological problems, such as excessive capacitive loads, which are a potential source of ramp-time errors, excessive interconnection delay, spreading of the clock skew problem over the entire chip. These problems are expected to become even worse in the next generations of VLSI technology.

Because of the inherent problems of bus-based architectures, SoCs in accordance with the present invention use parallel architectures. With the newest 0.13-micron process, that is already being announced by ASIC foundries, it is feasible to integrate more than 70 RISC cores, each equipped with several tens of KBytes, in a single chip at a very reasonable die size. The present invention includes larger numbers, e.g. 128 RISC cores, each with more than 1 Mb off on-chip RAM.

Figure 14:
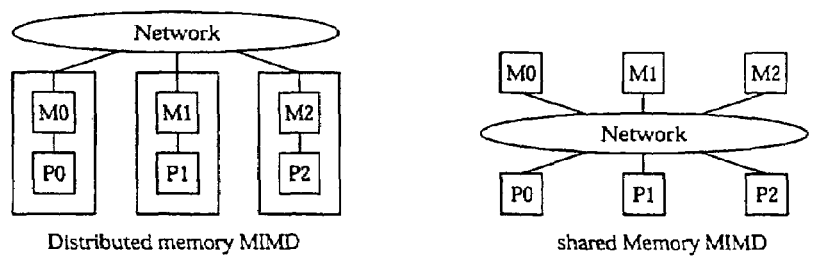
FIG. 14 schematically illustrates two alternative MIMD structures: distributed memory MIMD and shared memory MIMD.

There are at least two alternative MIMD structures, as shown in FIG. 14:

Distributed memory MIMD architectures: Each processor P0, P1, P2 has a private memory M0, M1, M2. Processor/memory pairs (or PEs: processing elements) work more or less independently of each other. Whenever interaction among PEs is necessary, they send messages to each other. This class of MIMD machines is also called message-passing MIMD architectures.

Shared memory MIMD architectures: Any processor P0, P1, P2 can directly access any memory module M0, M1, M2. The set of memory modules M0, M1, M2 defines a global address space, which is shared among the processors P0, P1, P2.

Figure 15:
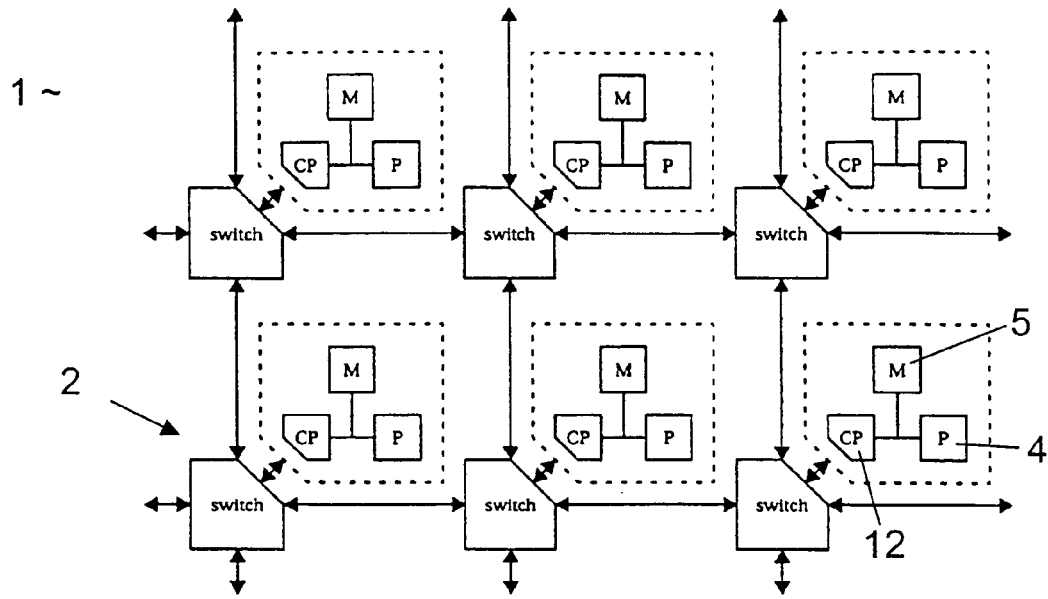
FIG. 15 illustrates that each processor has its local memory and communicates with other processing elements through a communication processor and a switching network.

The main disadvantage of shared memory systems is lack of scalability due to a contention problem. When several processors P0, P1, P2 want to access the same memory module M0, M1, M2 they must compete for the right to do so. The winner can access the memory, while the losers must wait. The larger the number of processors, the higher the probability of memory contention. Beyond a certain number of processors this probability is so high that adding a new processor to the system will not increase performance. There are several ways to overcome this problem. State-of-the-art approaches rely on the use of cache memories to reduce the memory contention problem. However, the cache coherence problems complicate the design of shared memory systems. Therefore, the distributed memory architecture is preferably selected for the present invention. Each node 2 of the network 1 is a processing element having a processor P which has its private memory M and communicates with other PEs through a communication interface, typically controlled by a communication processor CP and a switching network switch, as shown in FIG. 15.

Processing Element

Customisable RISC Processor Core

In accordance with an embodiment of the present invention, at the core of a node 2 is a processing engine, e.g. a RISC processor. A distinctive property of this processor is that it can be customized for a specific application domain, and can therefore be classified as an ASIP. According to the present invention, flexibility of a customization is dealt with in accordance with the following method steps:

a generic ASIP may be used. This is a low cost, general-purpose solution that can execute any C program. If this solution is not sufficient in terms of performance or power consumption, proceed to the next step.

Incrementally enhance the instruction set, until the design objectives are reached.

The advantage of this approach is that functional changes to the software can always be executed, because changes to the instruction set are enhancements, and not replacements of existing instructions.

Use of the retargetable compiler in the ASIP approach to SoC design is important. Its ability to deal with a dynamic instruction set determines to a great extent the quality of the final result. Therefore, the hardware architecture of the generic ASIP is tuned for the requirements of the compiler and not the other way around, as is usually the case.

The main features of the generic ASIP are:

Low cost: Since the generic ASIP is the starting point of the design exploration, it should be the lowest cost implementation that can execute any C program. Cost is a combination of silicon area and power consumption.

Extendable: The generic ASIP is extendable with special instructions to create a dedicated solution, preferably optimized for an application. This has an impact on the basic architecture of the generic ASIP. The basic architecture should not contain bottlenecks that prevent a performance improvement by adding special instructions, because that would defeat the purpose of ASIPs.

Synthesizable: The generic ASIP and its enhanced versions are preferably synthesizable and portable across a wide range of ASIC technologies. This has important consequences. For example, the use of multi-port register files is not advisable, since these are not supported by typical ASIC libraries.

Compatible with constraints of a retargetable compiler (e.g. Chess, available from target Complier Technologies, Leuven, BE). The microcode for the generic ASIP is generated by the retargetable complier. This puts constraints on the instruction set and pipelining (e.g. time stationary property).

Support for multi-threading: Hardware support for multi-threading allows easy and efficient mapping of system level models onto the implementation.

Support for message passing (block transfers)

Figure 16:
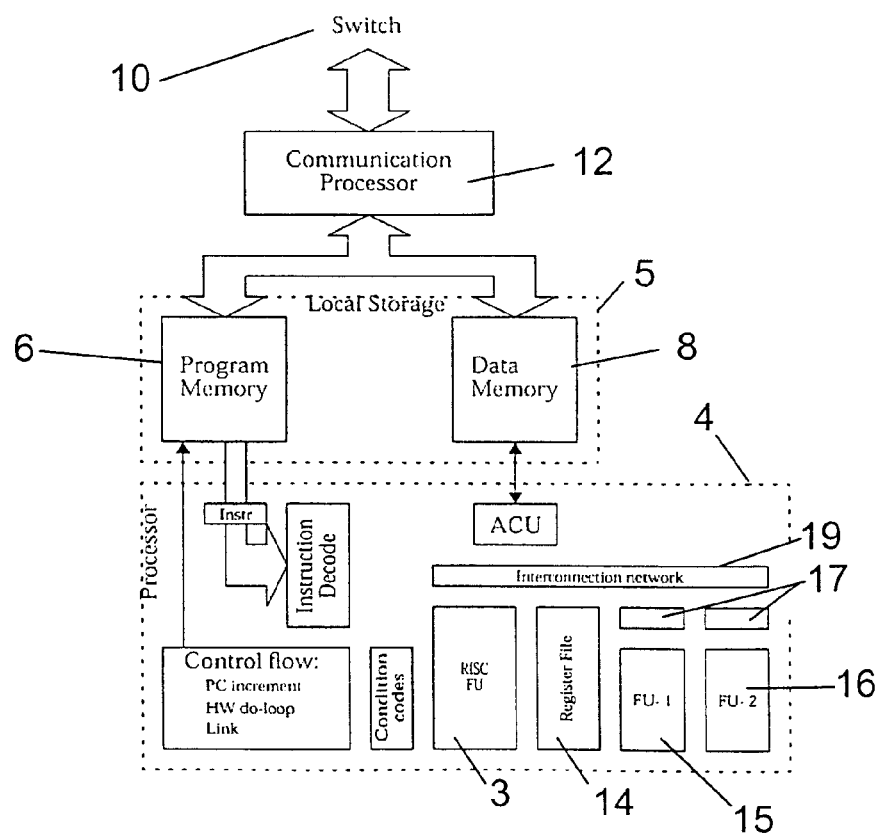
FIG. 16 shows the overall architecture of an ASIP.

The overall architecture of an ASIP in accordance with an embodiment of the present invention is shown in FIG. 16. Information is stored in different types of storage. Remote storage (not represented) is physically located at a distance that is large compared to the size of the processor 4. Program and data memories 6, 8 are located close to the processor 4 and hence are called local storage 5. Inside the processor 4, information is stored in registers part of a register file 14.

Access to remote storage is the slowest type of access. Since interconnect delay is expected to become the dominant factor of delay, the delay of access to data that is physically located at a large distance is high compared to the delay of access to other types of storage.

To overcome the problems of access to remote storage, an interconnect network 1 is used that is based on point-to-point connections and can use wormhole routing. Wormhole routing employs pipelining to reduce the latency of remote storage access and is extremely efficient if access is done in bursts. For that purpose, the architecture contains a communication interface 12, typically a communication processor, which is responsible for transferring blocks of data between the remote and the local storage via a switch means 10.

The amount of local storage can be considerable and the cost of local storage is a significant part of the overall cost. Therefore, the design of the local storage plays an important role. A number of architectural choices, such as the word size, the number of memory ports, CISC vs. RISC (which determines the code density) have an impact on the cost of local storage.

The size of the register file 14 has an effect on the cost and performance of the architecture and hence needs to be considered carefully. Preferably, a minimal size register file 14 is used:

Efficient multi-threading requires fast context switching. During a context switch, the state of the register file 14 is spilled to data memory 8. The smaller the register file 14, the faster the context switch.

It results in compact instructions, because the number of bits necessary to select the source and destination registers is small.

Fetching values from the registers can be done in the execute stage of the pipe-line. This reduces the load-use delay to zero without the use of special bypass circuits. As a result, load and store instructions can be pipelined with other instructions without creating pipeline stalls.

Multi-port register files, as supported by an implementation in flip-flops, enable to perform address calculation for load/store operations and arithmetic operations in parallel.

The negative impact of a small register file 14 on the performance, as described above, is limited, since the additional load and store instructions can be perfectly pipelined and hence only account for one additional cycle each. Moreover, the compact instructions make it possible to perform data transfer and data processing instructions in parallel. In that case, clever scheduling as implemented in a Chess compiler, can reduce the overhead to zero and probably improve the performance, unless there are data dependencies that prohibit parallel operation. For that purpose, it could be beneficial to have a few scratch registers (R1 to Rn) in the register file 14, where n is application dependent and should be kept as small as possible.

The processing engine 4 comprises a basic processor 3, such as a RISC processor, which is intended to carry out basic instructions such as arithmetic or logic instructions. Such a basic processor 3 may be configured with extension instructions either before implementing the processing engine 4, or by providing inside the processing engine 4 supplementary space for reconfiguring the basic processor 3.

Such supplementary space is represented in FIG. 16 by function units 15, 16, which may adapt the basic processor with specific instructions, for example for video-processing. These specific instructions are often used to speed up applications. Those function units 15, 16 may advantageously be implemented as embedded FPGA's or other digital programmable logic units such as PAL's, PLA's, PGA's etc.

An interconnection network 19 connects the basic processor 3 with the register file 14 and the function units 15, 16. Supplementary registers 17 may be provided next to the standard register file 14, and are then also connected with the interconnection network 19.

The other blocks represented in FIG. 16 are standard blocks. ACU is an address calculation unit.

The architecture shown in FIG. 16 is in line with existing RISC architectures:
A fixed instruction size. (CISC processors typically have variable length instruction sets)
A load-store architecture where instructions that process data operate only on registers and are separate from instructions that access local memory 6, 8.
A three-stage pipeline used in early RISC architecture such as processors RISC-II, ARM6 and ARM7.

A RISC architecture is preferred in accordance with the present invention because it has a number of advantages over a CISC:
RISC architectures are smaller, because they are simpler and require fewer transistors to implement the smaller instruction set.
RISC architectures take less time to design because they are less complicated.
RISC architectures have a higher performance because of the shorter instruction cycle.

The Performance/cost ratios of implementations based on the proposed approach have been evaluated using various examples. For the purpose of comparison the following metrics have been used:
Total Area: The sum of the area of the processor and RAMs. For the processor, the area is taken as reported by Synopsys Design Compiler. For the RAMs, it is taken from the datasheets supplied by the foundry.
Power Consumption: The power reported is the sum of the consumption in the processor (P), in the program RAM (PM) and in the data RAM (DM). The processor power consumption is the one reported by Design Compiler based on the toggle counts for a simulation speed of 40 MHz. This consists of the cell internal power (+/−50%) and the net switching power (+/−50%). The cell leakage power (<0.1%) is ignored. For the RAMs a weighed average is calculated based on datasheet information and counts of read, write and idle cycles during the simulation.
Number of cycles: The number of clock cycles the processor needs to process the given set of input data.
Performance: The average number of cycles needed to process one sample. This is equal to the number of cycles minus the initialization divided by the number of samples.
Energy per sample (nJ): This is equal to the power consumption (W) times the number of cycles per sample times the period of a cycle (25 ns).

EXAMPLE 1

FIR Filter

Figure 17:
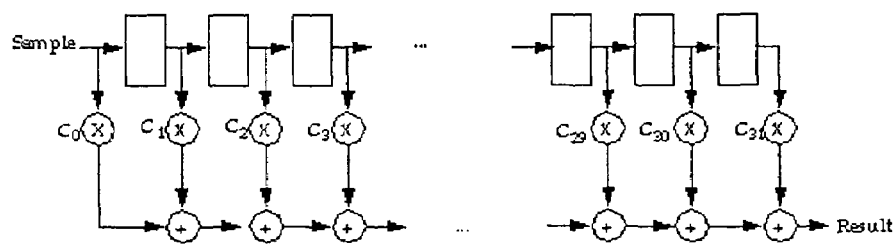
FIG. 17 illustrates an FIR filter concept.
Figure 18:
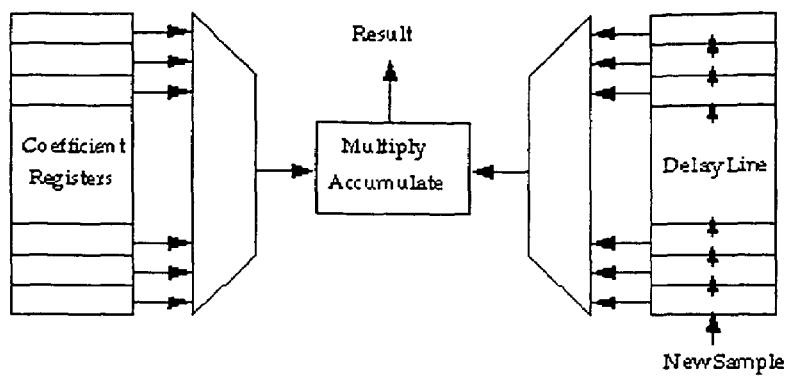
FIG. 18 shows an FIR implementation diagram.

The filter in this example is a linear phase 32-tap FIR filter for 16-bit samples and 12 bit coefficients. The result is saturated at $+/-2^{19}$ and then scaled by 0, −6, −12 or −18 dB. The FIR filter concept is shown in FIG. 17, and an FIR implementation diagram is shown in FIG. 18.

Several alternatives have been investigated all of which represent embodiments of the present invention:
Solution 1: All the operations are performed using the basic instruction set of the generic ASIP. All multiplications are expanded into a series of shifts and additions.
Solution 2: with MAC co-processor: A coprocessor has been added to the processor to perform the multiply-accumulate operation. It is mapped into the processors memory space, and occupies 4 addresses: one to initialize the accumulator register, one to set the first operand, one to set the second operand and to trigger the multiply-accumulate operation, and one to read back the accumulator register.
Solution 3: with MAC instruction: The processor is extended with a MAC unit that contains a 32-bit multiplier, a 32-bit adder and an accumulator register. It is able to execute a multiplication or a multiply-accumulation. Additionally, it contains 2 instructions to initialize the accumulator register and to copy the accumulator register into the register file.
Solution 4: special FIR instruction: The FIR extension unit implements a 32 bit 32 tap FIR unit. It can process 1 sample in 32 clock cycles. Basic blocks are a 32 stage delay line, 32 coefficient registers and a multiply accumulator. The unit adds 3 instructions to the instruction set: fir_SetCoef(index, value): sets a value in the coefficient register bank; fir_InitDelay( ): initialises the delay line to all zeros; fir_FIR(Sample): processes one sample.
Solution 5: without programmability: The full, dedicated hardware solution consists of a multiplier, a 32 stage delay line and 32 coefficient registers. It reads and writes a sample every 32 clock cycles.

The results for each of the solutions are shown in Table I.

TABLE I

| Architecture | Total Area (mm²) | Power (mW) | Nr. Cycles | Performance (cycles/sample) | Energy per sample (nWs) |
| --- | --- | --- | --- | --- | --- |
| Solution 1 | 0.79 | 20.09 | 183451 | 2735 | 1374 |
| Solution 2 | 0.72 | 20.07 | 26407 | 390 | 196 |

TABLE I-continued

| Architecture | Total Area (mm²) | Power (mW) | Nr. Cycles | Performance (cycles/sample) | Energy per sample (nWs) |
|---|---|---|---|---|---|
| Solution 3 | 0.70 | 22.22 | 11823 | 175 | 97 |
| Solution 4 | 1.01 | 17.07 | 3344 | 45 | 19 |
| Solution 5 | 0.29 | 13.44 | 2176 | 32 | 11 |

Some conclusions can be drawn:

Although solutions 2 and 3 are almost equal in area and power consumption, the extension unit solution (solution 3) is about twice as performant as the coprocessor solution (solution 2). This can be explained by the fact that the extension unit has a higher bandwidth to the register file and the fact that the compiler has the potential to exploit parallelism by clever scheduling.

The solutions with the multiplier extension unit or coprocessor, while being much faster, are actually smaller than the full software solution, because the multiply function occupies a lot of program memory.

The energy efficiency of solutions with special instructions is dramatically better than the full software solution.

Using special instructions, programmable solutions can be found that are close to dedicated hardware solutions with respect to performance and energy efficiency.

EXAMPLE 2

CRC Encoder

Figure 19:
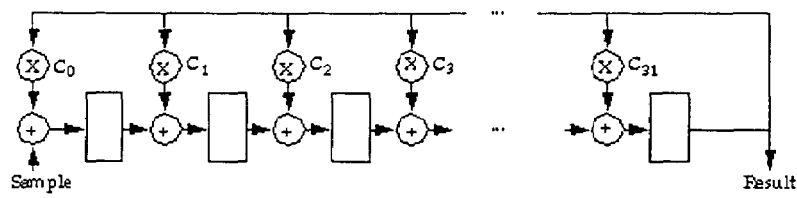
FIG. 19 is a functional diagram of a CRC encoder.

This example calculates the USB data CRC on an incoming bitstream divided in frames of 3200 bits. After every frame the CRC is appended to the data stream. The incoming and outgoing data are organized in 32-bit words. A functional diagram of a CRC encoder example is shown in FIG. 19.

Two alternatives have been investigated:

Solution 1: The first alternative is a pure software solution. Delay line and coefficients are implemented in the processors 32 bit numeric type, which allows an efficient implementation.

Solution 2: The CRC extension unit contains a 32-bit CRC register and a 32-bit coefficient register. It is able to update the CRC register for 8 subsequent data bits (the 8 lowest bits of the argument) in one clock cycle. The return value is the argument shifted to the right by 8 bit positions. So the CRC can be updated for a 32-bit argument by invoking the CRC update instruction 4 times. Besides the CRC update instructions, the unit also contains instructions to set and read the Coefficient register and to initialize and read the CRC register.

The results for each of the solutions are shown in Table II.

TABLE II

| Architecture | Total Area (mm²) | Power (mW) | Nr. Cycles | Performance (cycles/sample) | Energy per sample (nWs) |
|---|---|---|---|---|---|
| Solution 1 | 0.57 | 17.07 | 529137 | 529 | 226 |
| Solution 2 | 0.46 | 15.84 | 11076 | 11 | 4 |

As expected, Solution 2 is not only better in terms of performance, but also in terms of area (smaller program RAM) and energy efficiency.

EXAMPLE 3

Reed Solomon Encoder

Figure 20:
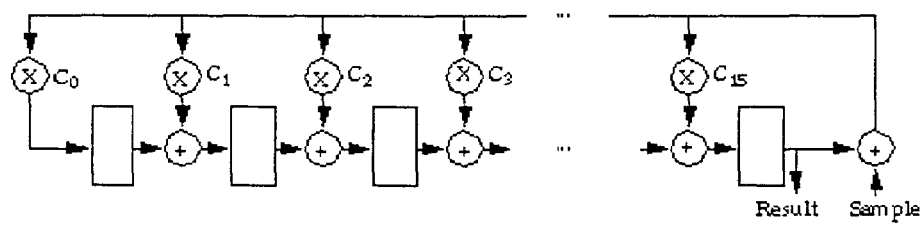
FIG. 20 is a functional diagram of a Reed Solomon encoder.
Figure 21:
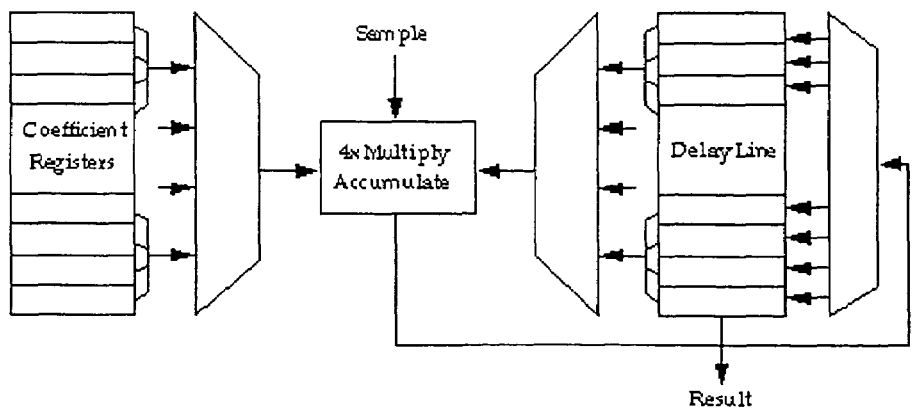
FIG. 21 is an implementation diagram of a Reed Solomon encoder.

Reed Solomon encoding follows a scheme similar to a CRC calculation. However, while the 'typical' CRC circuit operates on bits, the Reed Solomon Encoder processes multiple bits (in the present case 8). The CRC AND is replaced by a Galois Field multiplication and the XOR by a Galois field addition. The datastream to be encoded is divided in blocks—239 bytes in the case of this example. After initialisation of the delay line to all zeros, each byte of the datablock is fed into the encoder. At the end, the content of the delay line (16 bytes) is appended to the datablock. The incoming bytes are interpreted as the polynomial representation of a number in $GF(2^8)$ (i.e.: the bits of the data are the coefficients of the polynomial). A functional diagram of the RS encoder is given in FIG. 20, and an implementation diagram is given in FIG. 21.

Several alternatives have been investigated:

Solution 1: Software-only solution: The $GF(2^8)$ addition is implemented as a bitwise XOR in the polynomial representation. For the multiplication, the index representation (i.e: each element is an element of the set $\{0, \alpha^0, \ldots, \alpha^k, \ldots, \alpha^{254}\}$). In the index representation, the index of the product of X and Y is the sum of the indices of X and Y modulo 255. For the conversion between polynomial and index representation, lookup tables are used. This requires 2 tables having 256 entries each. These tables are calculated during initialization.

Solution 2: Extension with $GF(2^8)$ multiplier unit: The $GF(2^8)$ multiplier unit is able to calculate the product of 2 elements of $GF(2^8)$ in polynomial representation in 1 cycle. The product of X and Y in $GF(2^8)$ is defined as (X*Y) mod G, with * the polynomial multiplication if GF(2) and G the generating polynomial. This multiplication is executed by dedicated hardware (very similar to a CRC calculation) and does not use lookup tables as the software does.

Solution 3: Extension with Reed Solomon Encoder unit: The Reed Solomon Encoder Unit implements the complete encoder. It contains a coefficient register bank, a delay line and 4 $GF(2^8)$ multipliers and adders. The processing of 1 sample takes 4 clock cycles: (1) calculation of the feed back and calculation and update of delay (12) to delay (15); (2) calculation and update of delay (8) to delay (11); (3) calculation and update of delay (4) to delay (7); (4) calculation and update of delay (0) to delay (3) and providing the result to the processor. The unit adds 4 instructions to the processor's instruction set: 2 instructions to set and read a coefficient, 1 instruction to initialize the delay line and 1 instruction to process 1 sample. Reading the content of the delay line is performed by shifting the result of the previous cycle back into the encoder. In that way the feedback will be zero, resulting in a pure shift.

Solution 4: For this solution, the functionality of the extension unit has been embedded in a shell to build a stand alone RS encoder. Coefficient registers and delay line are implemented as registers.

The results for each of the solutions are shown in Table III.

TABLE III

| Architecture | Total Area (mm$^2$) | Power (mW) | Nr. Cycles | Performance (cycles/sample) | Energy per sample (nWs) |
|---|---|---|---|---|---|
| Solution 1 | 3.04 | 28.56 | 454051 | 372 | 266 |
| Solution 2 | 0.60 | 24.87 | 148991 | 122 | 76 |
| Solution 3 | 0.48 | 18.91 | 7122 | 6 | 2.8 |
| Solution 4 | 0.09 | 21.62 | 9576 | 4 | 2.2 |

It is to be observed that Solutions 2 and 3 are almost equal in area and power consumption, however solution 3 is almost 20 times faster than solution 2.

EXAMPLE 4

Reed Solomon Decoder

The Reed Solomon decoder in this example is able to correct 8 byte errors on a 239 byte block. From the incoming Reed Solomon encoded data, a number of polynomials is calculated. The roots of these polynomials indicate the position (byte number) and magnitude of the error.

Several alternatives have been investigated:

Solution 1: software-only solution: The Reed Solomon decoder algorithm requires some additions and multiplications in the GF(28) field as well as 'normal' multiplications. For this implementation, all these operations are mapped on the basic instruction set.

Solution 2: Extension with GF(28) multiplier unit: In this implementation, the most expensive operation, the GF(28) multiplication, is executed with a special instruction.

Solution 3: Extended with GF(28) and multiplier unit: In this implementation, the 'normal' multiplication as well as the GF(28) multiplication are performed with special instructions. Therefore 2 extension units are used.

The results for each of the solutions are shown in Table IV.

Communication Processor

In accordance with an embodiment of the present invention a communication processor 12 forms the interface between the local 6, 8 and remote storage, as shown schematically in FIG. 16 and in FIG. 22. It receives messages from the switch 10 and translates them into read and write access to the local memory 6, 8. Vice versa, it compiles messages and transmits them to the switch 10. The communication processor 12 operates in parallel with normal program execution. This makes it possible to pipeline data transfer and data processing. For example, while the PE is processing an ATM cell, the communication processor 12 is retrieving the next cell. As a consequence, the PE and the communication processor 12 share access to the local memory 6, 8 and arbitration is required.

Because of the properties of the interconnection network 1 transfers are preferably executed in burst mode. For this reason, the communication processor 12 is preferably optimized for block transfers:

a message is segmented into packets packets contain a header with routing information packets are stored in short FIFOs 22, 24 that decouple the data rate between the transfer clock domain 26 and the processor clock domain 28.

High-Speed Switching Network

In a CPPA architecture in accordance with embodiments of the present invention, memory access of a remote memory block is preferably prohibited. Whenever access to a remote memory location becomes necessary, its content is preferably requested by sending a message to the processor 4 owning that memory area.

The focus in designing message-passing parallel computers is the organization of the communication subsystem, that is, the interconnection network 1 of processing elements and the hardware support for passing messages among nodes of the parallel computing system.

The interconnection network 1 is preferably realized in accordance with an embodiment of the present invention via point-to-point connections between the nodes. Point-to-point links have many advantages over bus based communications in a SOC with many devices:

TABLE IV

| Architecture | Total Area (mm$^2$) | Power (mW) | Nr. Cycles | Performance (cycles/sample) | Energy per sample (nWs) |
|---|---|---|---|---|---|
| Solution 1 | 4.31 | 37.28 | 691572 | 585 | 545 |
| Solution 2 | 4.34 | 38.45 | 220825 | 167 | 161 |
| Solution 3 | 4.48 | 43.75 | 206480 | 142 | 155 |

First, there is no contention for the communication mechanism, regardless of the number of devices in the system. The communications bandwidth does not saturate as more communication devices are added to the system. Rather, the larger the number of devices, the greater the total communications bandwidth of the system.

Second, with proper placements, point-to-point links are short and therefore they are fast and have a minimal capacitive load penalty.

Third, the absence of long lines makes the performance more predictable, reducing the number of design iterations.

Fourth, there is a potential for power savings. With a shared medium, the medium has to be charged and discharged completely, even if information needs to be transported over a fraction of the medium's length. A network with point-to-point links, only needs to charge (and discharge) the links that carry information.

Fifth, large busses spread the clock skew problem over the entire chip, while point-to-point connection have the potential to confine the clock skew problem into smaller clock islands.

For these reasons, bus-based interconnection networks need to be replaced by a different network. The design of such an interconnection network has three main considerations:

The topology of the network has a significant influence on the message transmission time.

The switching technique is the actual mechanism by which the messages are transmitted from input buffers to output buffers.

The routing protocol plays a crucial role in finding communication paths between source and destination nodes.

There are three main considerations in the selection of a network topology:

Node degree: the number of input and output links of a node. The node degree represents the cost of a node from the communication point of view.

Network diameter: Let S be the set of shortest paths between all pairs of nodes in the network. D is the number of connection arcs along the longest path of S. The network diameter is important from the point of view of latency. In order to achieve low latency the diameter should be kept as small as possible.

Network Link length: The link length of the network is length of the longest link, after mapping the topology on the 2-D surface of the chip. Interconnection delay, which is proportional to the length, is the dominant factor is the delay of the communication network. A topology with small link length is preferable.

Many topologies exist: linear array, ring star, tree (binary and fat), 2-D mesh, wraparound 2-D mesh, honeycomb, 3-D mesh, hypercube, etc. Of this list, the linear array, 2-D mesh and honeycomb topology have acceptable network link lengths:

Linear array: The simplest way to connect nodes is the linear array topology. It requires a low node degree, resulting in low cost, but has the worst diameter of all possible topologies.

Honeycomb: Very good link length and diameter properties, but high node degree, resulting in high cost.

2-D mesh: Is a good compromise between the linear array and honeycomb. It has a minimal link length, excellent diameter and acceptable node degree.

Based on the arguments above, the 2-D mesh topology of FIG. 15 is preferably selected for the present invention.

Switching is the actual mechanism by which a message is removed from the input buffer and placed in the output buffer. The switching technique applied has a significant effect on message latency and hence the choice of switching method is important in designing any distributed memory system. Several switching techniques exist:

Packet switching: packet switching behaves in a store-and-forward manner similar to mail service. A packet consists of a header and data. The header contains the necessary routing information and, based on that information, the switching unit decides where to forward the packet. The unique feature of the packet switching scheme is that when a packet arrives at an intermediate node, the whole packet is stored in a buffer. The packet is forwarded to a neighboring node if an empty buffer is available in that node. Packet switching has two important drawbacks: The message latency is proportional to the message path length and it consumes significant memory space for buffering every incoming packet.

Circuit switching: circuit switching methods behave analogously to telephone systems where a path between the source and destination is initially built up and the circuit is held until the entire message is transmitted, after which the circuit path is destroyed. The most important benefit of circuit switching is that the latency becomes independent from the communication distance, if the circuit establishment phase is much shorter than the transmission phase.

Virtual cut-through: Virtual cut-through combines the benefits of packet and circuit switching. The message is divided into small units called flow control digits, or flits. As long as the required channels are free, the message is forwarded between nodes, flit by flit in a pipeline fashion. If a required channel is busy, flits are buffered at intermediate nodes.

Wormhole routing: Wormhole routing is a special case of virtual cut-through, where the buffers at the intermediate nodes are the size of a flit. Wormhole routing has the benefits of circuit switching (low latency, low memory requirements), without the need for an explicit circuit establishment and termination phase. Moreover, wormhole routing can perform packet replication, circuit switching cannot. Packet replication is useful in implementing broadcast and multicast communication.

In the case of wormhole routing, channels can be shared by multiple messages after introducing the virtual channel concept. Virtual channels make it possible for several independent messages to use the same physical channel by providing multiple buffers for each channel in the network. Virtual channels result in the following advantages:

Virtual channels increase network throughput by reducing physical channel idle time. A blocked message cannot block all messages on the physical links it uses.

Virtual channels can be used for deadlock avoidance. Deadlock is a situation in the network when a subset of messages is mutually blocked waiting for a free buffer to be released by one of the other messages. The usage of virtual channels for deadlock-free routing algorithms comes from the recognition that a necessary and sufficient condition for deadlock-free routing is the absence of cycles in the channel dependency graph. A simple way of eliminating cycles from any channel dependency graph is to split physical channels into groups of virtual channels. The channel dependency graph is a directed graph that can be constructed from the network and the routing algorithm. Vertices of the graph are (virtual) channels, and the edges are the pairs of connected channels as it is defined by the routing algorithm. Virtual channels can be used to eliminate cycles in the dependency graph.

Virtual channels facilitate the mapping of the logical topology of communicating processes onto a particular physical topology.

Virtual channels can guarantee bandwidth to certain system-related functions.

The task of routing is to determine the path between the source and the destination nodes of a message. Routing has great influence on the performance of the network and hence it plays a crucial role. Routing algorithms that are easy to implement in hardware are preferable.

Routing algorithms are divided into two classes: deterministic routing and adaptive routing:

In deterministic routing the path is completely determined by the source and destination nodes. Three deterministic routing schemes are applied in practice:

Street-sign routing: The message header contains routing information for those intermediate nodes where the message should turn.

Dimension-ordered routing: The main idea is that messages travel along a certain dimension until they reach a certain co-ordinate of that dimension. At this node they proceed along the next dimension. Deadlock-free routing is guaranteed if the dimensions are strictly ordered.

Table-lookup routing: At each node a routing table contains the identifier of the neighboring node to which the message should be forwarded for each destination node.

Interval labeling: A special case of table-lookup routing in which each output channel of a node is associated with an interval.

In adaptive routing intermediate nodes can take the actual network conditions into account and determine accordingly which neighbor the message should be sent.

Dimension-ordered routing is the simplest one, but cannot be enhanced with adaptive routing. Table-lookup is more general, but too expensive in terms of hardware. Interval labeling may be a good compromise.

Another problem to be solved in a network is hot spot avoidance. When too many messages are routed through the same node or link, it results in a drastic reduction of throughput, since most arriving packets will be delayed for an unpredictable length of time. Such a node or link through which many messages are routed, is called a hot spot. A simple method to avoid the occurrence of hot spots in a network is to realize a two phase routing in which the first phase randomly routes the message to a randomly selected node and in the second phase the message is routed from this node to the original destination node. This scheme, referred to as universal routing, was designed to minimize delay in heavily loaded networks. Although it increases latency and reduces maximum throughput, it was proven by both simulation and theory that universal routing guarantees that worst-case performance is not far below maximum performance, whereas without using universal routing the worst-case performance can be several orders of magnitude worse than the highest performance.

An embodiment of the switch network of the present invention is based on the following choices:

2-D mesh topology.

wormhole routing, number of virtual channels=1.

dimension-ordered deterministic routing, but the present invention is not limited thereto and includes all the above methods.

The main reason for the above choices is simplicity and experiments have shown that the performance is acceptable.

In wormhole routing, a message is partitioned into a number of packets. Each packet has a header that contains the co-ordinates of its destination. When a header enters a switch, this information is used to determine which output port is used to route the packet to the next switch. One can think of this process as a worm that propagates through a maze and the head of the worm looks for the best path through the maze.

Besides the routing algorithm, the propagation mechanism itself is an important issue. When the header is blocked, the propagation must be stalled and all information properly stored until the header can proceed. The propagation process is illustrated in FIG. 23 in one dimension which shows three identical nodes 2 as part of a network 1 in accordance with an embodiment of the present invention.

The propagation is a two-phase systolic operation:

phase 1: routing: Data is copied from the input buffer 30 to the output buffer 32 of a first node that is selected by the routing algorithm if:

the input buffer 30 contains data the output buffer 32 is empty phase 2: transfer: Data is copied from the output buffer 32 of the first node to the input buffer 30 of the neighboring second node if:

the output buffer 32 of the first node contains data the input buffer 30 of the second node is empty The systolic data transportation is achieved by performing an iteration of phase 1 of all switches 10, followed by phase 2 of all switches 10. An implementation of this principle can be accomplished by using the rising edge of the transport clock for the transfer phase and the falling edge for the routing phase, as shown in FIG. 23.

It is to be observed that:

The latency over a switch is one clock cycle. The minimal latency of a message is therefore equal to the number of switches on the path from source to destination.

The design is not sensitive to clock skew. A skew of approximately half the clock period over the links can be tolerated before the system fails.

Figure 24:
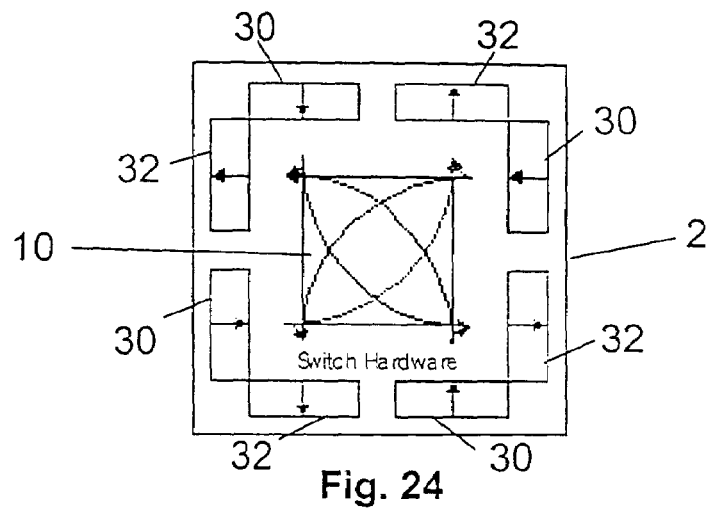
FIG. 24 illustrates an extension of the pipelining principle to a 2-dimensional mesh.
Figure 25:
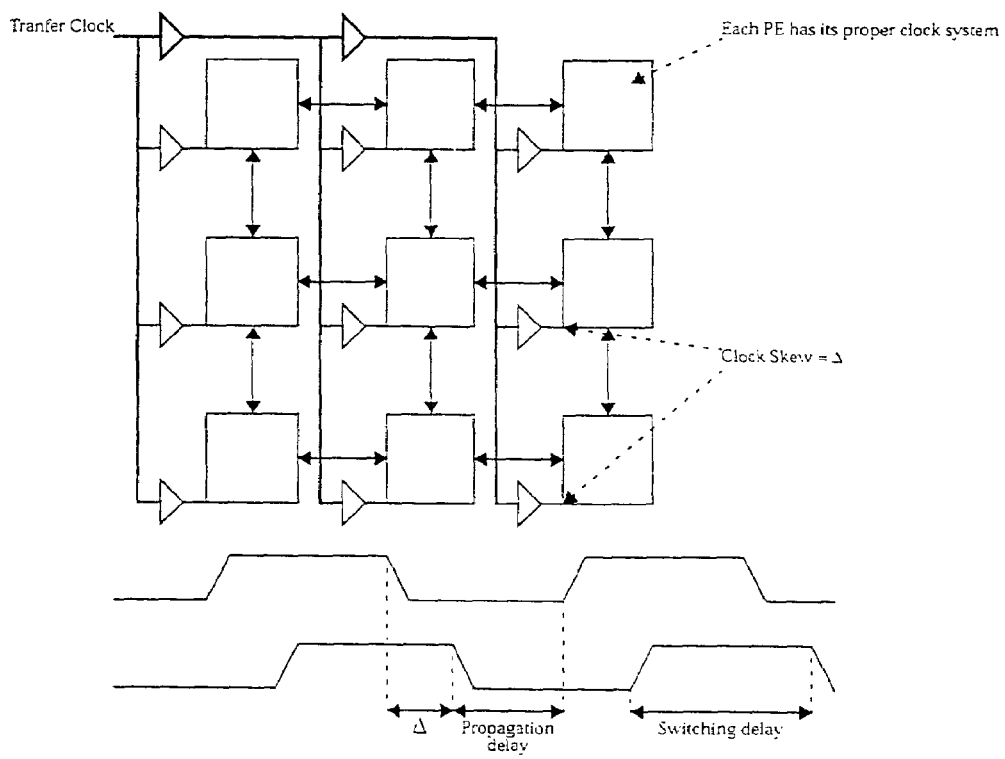
FIG. 25 illustrates clock distribution in a SoC.

The pipelining principle can be extended to a 2-D mesh, as shown schematically in FIG. 24. In this case, instead of having two neighbors as in the 1-D propagation mechanism of FIG. 23, a node 2 has four neighbors (not represented), one to the north, one to the east, one to the south, and one to the west. Again, the propagation is a two-phase systolic operation with a routing phase and a transfer phase as explained for the 1-D propagation mechanism, but now data coming in from one direction can move in three directions. For example data coming in from a neighbor on the west of the represented node 2, can move to the north, to the east or to the south, as represented by the arrows in the switch 10 of node 2.

An equal amount of time is provided for the physical data transfer and the switching hardware.

Using both edges of the clock makes it easy to use clock gating for reducing the power consumption.

Because of the pipeline structure, the system is partitioned into clock islands. Each island has its proper clock system (called processor clock), that is independent from clock systems from other islands. This has the advantage that in each clock island, the clock frequency can be reduced to minimize power consumption. In that respect, the system can be considered as a coarse grain asynchronous system.

The clock islands communicate through the pipeline structure of the switches 10. The pipeline is driven by a transfer clock, as shown in FIG. 22 (transfer clock domain) and in FIG. 29. In contrast to the processor clocks, which are local clock systems, the transfer clock is a global clock system that spans the complete system. Therefore, special care must be given to the distribution of the transfer clock. Although clock skew cannot cause system failure, because the pipeline clock scheme guarantees that reducing the clock frequency will eventually solve any clock skew problem, it can cause performance degradation.

If the sum of the clock skew and the propagation delay of signal between neighbors becomes comparable to the amount of time required by the switching logic, additional clock skew will force a reduction of the transfer clock frequency and degrade the performance of the interconnection network.

The performance of a 2-D switching network in accordance with the present invention is now described and compared with the performance of a bus-based network. The following performance parameters are considered:
- aggregate bandwidth: defined as the sum of the sustainable I/O bandwidth of each client of the network.
- latency: defined as the number of cycles between the insertion of a packet in the input FIFO and the arrival of the packet at the output FIFO.
- power consumption specified in mW/Mbps.

The performance analysis and comparison is based on the following assumptions:
- The width w of the bus is equal to 16. This value is also used as the width of the links between the nodes in the 2-D mesh. The results of the analysis and comparison can easily be extrapolated for wider busses.
- The transfer clock frequency f is equal to 100 MHz for the bus and the 2-D network. It is to be noted that in practice, the transfer clock frequency of the 2-D network can probably be a multiple of the frequency of the bus-based network, because all connections in the 2-D network are very short. For the sake of comparison, the performance of the bus-based network is over-estimated.

Figure 26:
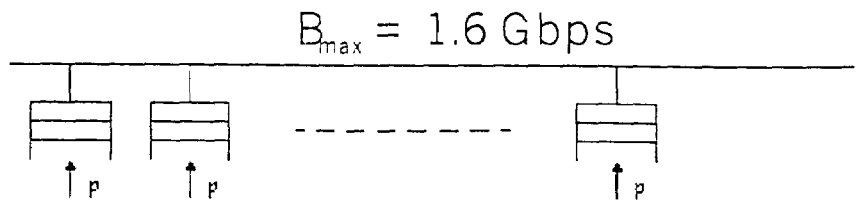
FIG. 26 shows a simulation model of a single bus network.

To evaluate the performance of a single bus network, a simulation model as in FIG. 26 is created. It is assumed that:
- N=the number of clients on the bus.
- p=probability that a packet is pushed on the FIFO.
- PL=packet length.
- arbitration algorithm is round robin and does not cause a performance overhead.
- FIFO size is large—it is assumed that overflow never occurs.

The average bandwidth B on the bus is a function of p and the bandwidth is limited to $B_{max}$:

$$B = p \times N \times PL \times w \times f$$

$$B_{max} = w \times f$$

An utilization factor U is defined:

$$U = \frac{B}{B_{max}} = p \times N \times PL$$

It is clear that the utilization factor U has an impact on the latency. Given L, the latency of a packet in terms of clock cycles, then $L_{90}$ is defined as the latency for which the probability that $L < L_{90}$ is equal to 90%. The relation between the utilization factor U and the latency for busses has been determined by means of extensive simulations. The results are shown in table V:

TABLE V

| U | PL = 4 | | PL = 8 | |
| --- | --- | --- | --- | --- |
| | $L_{av}$ | $L_{90}$ | $L_{av}$ | $L_{90}$ |
| 0.5 | 4 | 9 | 10 | 19 |
| 0.8 | 10 | 24 | 21 | 46 |
| 0.9 | 20 | 48 | 42 | 96 |
| 0.95 | 39 | 93 | 74 | 176 |

To limit the cost of the FIFO, $L_{90}$ must be small. To reduce the impact of communication latency on the computational power (fetching data may cause processing stalls), the average latency must be limited. For practical reasons, it is assumed that:
- The average latency<3 packet times.
- $L_{90}$<6 packet times.

This corresponds to a utilization factor U of approximately 80%.

In these circumstances, the bandwidth per client is limited to:

TABLE VI

| N | Max bandwidth/client (Mbps) |
| --- | --- |
| 16 | 80 |
| 36 | 35.5 |
| 64 | 20 |
| 100 | 12.8 |

These numbers demonstrate the fact that a bus-based network does not scale well with the number of clients. If the number of clients on the bus increases, the maximum bandwidth per client decreases proportionally.

To evaluate the performance of the 2-D mesh in accordance with the present invention, a simulation model is created. The following assumptions are valid:
- w=16, the width of the links between the switches
- f=100 MHz, transfer clock frequency. As demonstrated hereinafter, the actual transfer clock frequency can be as high as 300 MHz, using a state-of-the-art 0.25μ technology.
- p=probability that a packet is pushed on the FIFO
- PL=4, packet length.

By means of simulation, the utilization factor U is determined for comparable average latency and $L_{90}$. In case of the 2-D mesh network, the utilization can be higher than one, because several packets can be transferred in parallel.

As can be expected, the simulations show that the average distance over which the packets must travel has an impact on the utilization factor. The quantify this effect, two series of simulations are performed:
- Dmax=2N−2: source and destination nodes are distributed randomly over the 2-D mesh.
- Dmax=2: source and destination nodes are distributed randomly over the 2-D mesh, but the Manhattan distance between source and destination is smaller or equal to 2. This means that each node can only communicate with the 12 closest neighbours. The bandwidth to nodes at a larger distance is assumed to be negligible.

The results of the simulations can be expressed as the utilization factor $U_n$, normalised to the utilization factor (U) of a bus-based network as a function of the network size. For example, if $U_n$=1, the aggregate bandwidth of the network, for which the average latency is approx. 3 packet times and $L_{90}$ is approximately 6 packet times, is equal to the utilization factor of a bus-based network, which is 0.8 $B_{max}$. In other words, if $U_n=1$, the average bandwidth per nodes is the same for the 2-D mesh and the bus-based network. if $U_n=2$, the 2-D mesh network is 2 times better, with respect to the bandwidth for the same latency.

The following conclusions can be made:

Even in case of very pessimistic assumptions (same transfer clock frequency and every node communicates with every other node with the same probability), the 2-D mesh network is substantially better, especially if the size of the network grows. Table VII shows the normalized utilization factor $U_n$ of the 2-D mesh network:

TABLE VII

| N | $U_n$ |
|---|---|
| 4 × 4 | 7.5 |
| 8 × 8 | 15 |
| 10 × 10 | 17.5 |

In case of more realistic assumptions (the bandwidth of global communication is negligible compared to the communication of a node with its 12 closest neighbors), the performance of the 2-D mesh network is dramatically better than a bus-based network. Table VIII shows the normalized utilization factor $U_n$ of the 2-D mesh network in case $D_{max}=2$:

TABLE VIII

| N | $U_n$ |
|---|---|
| 4 × 4 | 8.7 |
| 8 × 8 | 35 |
| 10 × 10 | 56 |

If it is assumed that the processor clock frequency is more than 2 times slower than the transfer clock frequency (which is not unlikely: synthesis results show a factor close to 3), the processor can insert packets at half of the maximal transfer bandwidth. The performance of the 2-D mesh network is very close to the theoretical maximum.

For practical distances between the nodes of the network ($D_{max}=2$), the influence of the packet length on the message latency, and the bandwidth implications of the message latency has been analyzed. A packet length of four will give a very bad useful data/overhead ratio, so the simulations are only interesting for the case of larger packet lengths. Extensive simulations were done for message sizes of 1, 2, 3, 4, 5, 6, 8 and 10 packets, and this for packet lengths of 8, 12 and 16 times 16 bits.

Figure 27:
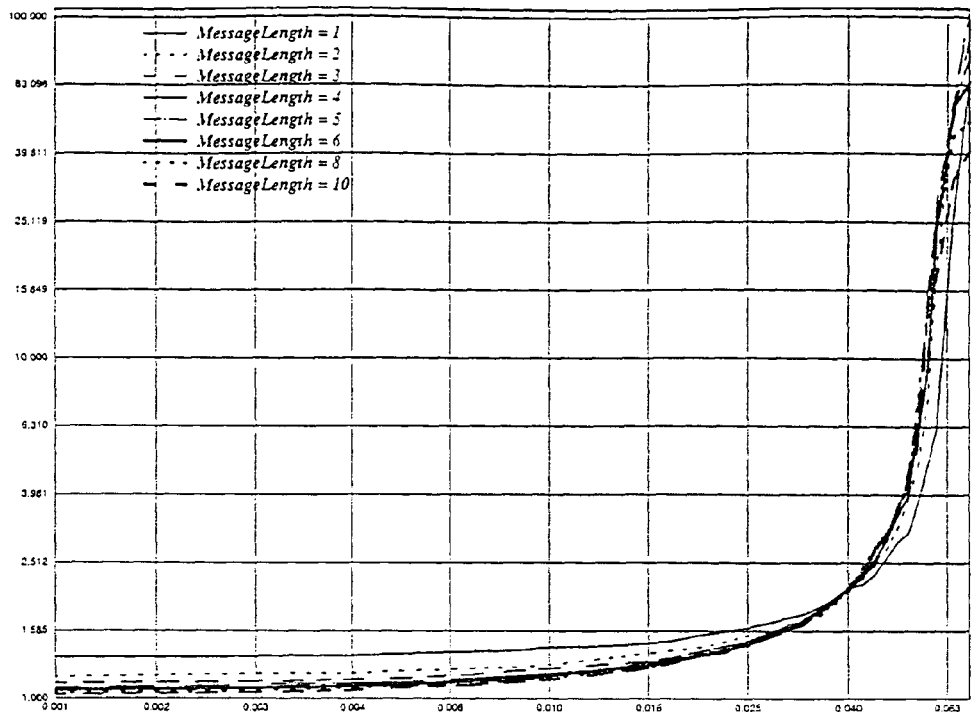
FIG. 27 is a graph illustrating the relation between bandwidth in the network and latency of transmission of a message.
Figure 28:
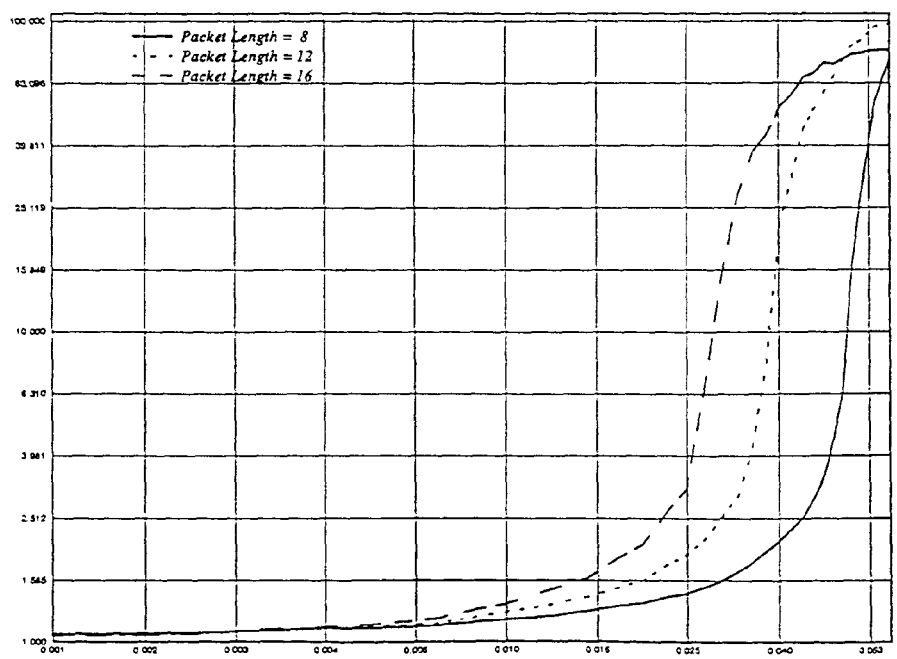
FIG. 28 is a graph illustrating results of simulations of latency for 1 packet length.
Figure 29:
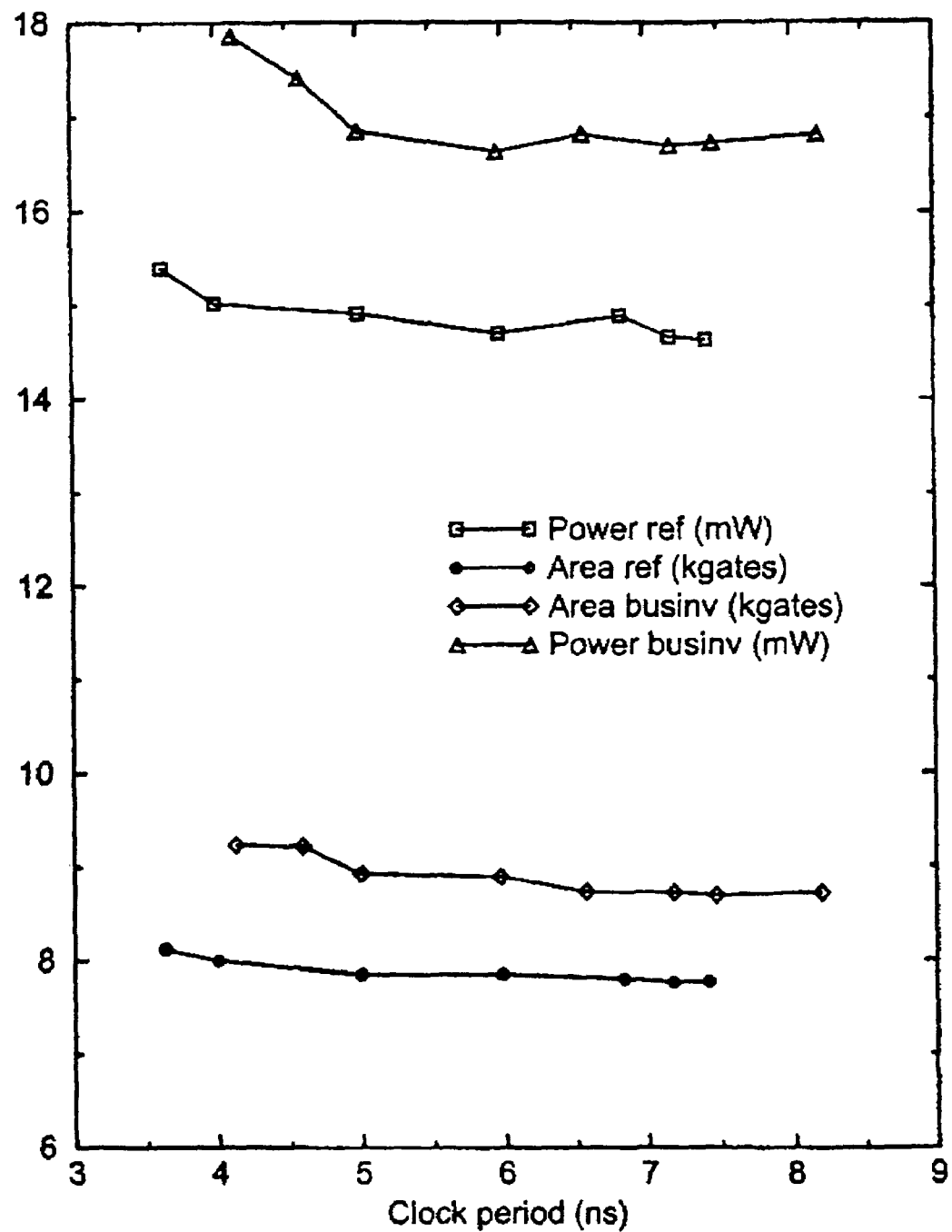
FIG. 29 graphically shows increasing power and area consumption for a bus inversion implementation of the interconnection network.

The plots shown in FIGS. 27-29 contain the relation between the bandwidth in the network and the latency of transmission of a message.

A measure for bandwidth is the probability with which a packet is inserted in the transmit queue of the switch. For example, if the probability is x%, every x clock cycles (of the processor clock) a full packet is inserted.

The latency is defined as the time between the insertion of the first word of the message in the transmit queue and the reception of the last word of the message in the receive queue. The time is measured in number of clock ticks of the transfer clock and normalized with the number of words in the messages. For example, if a message of 10 packets of length 8 takes 100 clock cycles to transmit, the latency is 100/(10*8)=1.25.

The transfer clock frequency is assumed to be twice the processor clock frequency. Transfer words are 16 bits wide, processor words are 32 bits wide.

The plot of FIG. 27 shows the results of the simulations for one packet length (i.e. packet length 8, and array size 4×4). The following conclusions can be made:

The latency is independent from one if the message length (for a specific packet length, and in the range of normal use) is relatively small, which is an important property of the 2D-network. This independence of message length enables to make use of a variable message length for the different commands the nodes will need to support. This has the advantage that 'useless overhead' (data that has no meaning except filling a packet/message until the packet/message has the expected/pre-negotiated size) is limited to the bytes necessary to have packets of a given packet length.

If the probability is smaller than 4%, the average latency is smaller than 2.5. With a packet length of 8, each packet contains 3 data words of 32-bits. This implies that if each processor transmits at a rate of less than 12 words per 100 processor clock cycles, the average latency is smaller than 2.5.

With the simulation results given in the previous paragraphs, a decision can be made about the packet and message lengths. When the latencies (in function of the probability a processor sends a packet onto the bus per unit of time) of different packet lengths (4 gives to much overhead, so it is not taken into account here) are compared, it is noted that a higher packet length calls for a lower transmission rate per processor. However, when it is taken into account that a packet with packet length 16 sends twice as much bits per packet on the bus, compared with a length-8 packet ('Norm Prob' in Table IX), then it is seen that this factor (and the utilization factor) is almost the same for every packet size. Table IX shows the influence of packet length in an 8×8 array.

TABLE IX

| PL | Max Prob | Norm Prob | $U_n$ |
|---|---|---|---|
| 8 | 0.0475 | 0.475 | 30.4 |
| 12 | 0.031 | 0.465 | 29.8 |
| 16 | 0.0235 | 0.47 | 30.1 |

The possibility of 'unused overhead' has to be taken into account, which increases when the packet length increases, and which reduces the useful bandwidth. The simulation results are shown in FIG. 28. When messages tend to be rather small, it is recommended to confine the packet size to 8. When practice shows the use of many rather large messages, it may be useful to change to a higher packet size.

If packets that need to be routed to the same output buffer, simultaneously arrive in a switch, an arbitration scheme is required. Several options have been evaluated:

Fixed order: all input buffers are scanned in a fixed order. The first buffer that contains a packet will be selected. Back-to-back packets have an idle cycle inserted. This prevents a message to monopolize a connection.

Round robin: all input buffers are scanned, starting from the last selected input buffer. The first buffer that contains a packet will be selected.

First come first serve: The packet that has been waiting for the longest time, will be selected.

Extensive simulations show that only in case of extreme utilization, outside the range of normal operation, there is an impact of the arbitration algorithm. Therefore, the simplest arbitration algorithm is selected.

The results of logic synthesis of a switching element for different clock frequencies are shown in table X. The configuration of the switching element is as follows:

16 bit data width dimension ordered routing 0.25 micron standard cell technology (Artisan library; TSMC foundry)

interface to communication FIFO included testability not included routing area not included no special optimization included Gate count in table X is defined as the number of 2-input NAND gates that would occupy the same area.

TABLE X

| Transfer clock frequency | gate count | | |
|---|---|---|---|
| | Combinational | Non-Comb (374 FF) | Total |
| 275 MHz (max) | 4954 | 3168 | 8122 |
| 250 MHz | 4835 | 3165 | 8000 |
| 200 MHz | 4692 | 3159 | 7851 |
| 135 MHz (no timing constraints) | 4699 | 3074 | 7773 |

The power consumption of the interconnection network is a major concern, since it contains a large amount of flip-flops, clocked at a high clock frequency. Various optimizations are included within the scope of the present invention to reduce the power consumption:

Bus inversion can be used to minimize the number of transitions on the wires. If more than half of the bits of a bus change value, the inverse of the data is send. This reduces the transitions on all the busses along the path from source to destination. The longer the path, the better the improvement of the power consumption. However, the additional logic required to make the bus inversion decision increases the area (14%) and the power consumption (11%), as shown in FIG. 29. Therefore, bus inversion is only useful if many packets must travel over a long distance (something that must be avoided anyway).

Figure 30:
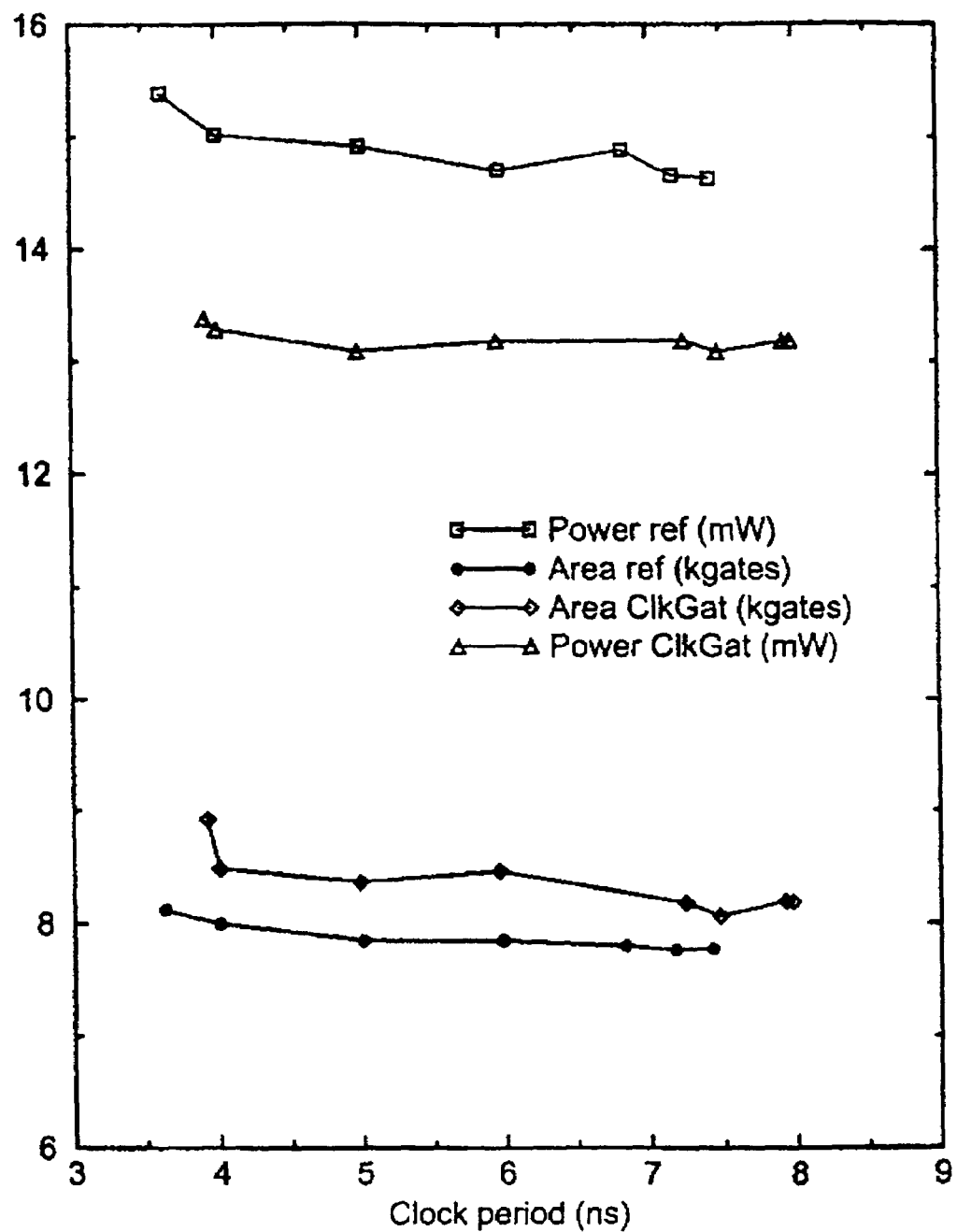
FIG. 30 graphically shows power gain for a clock gating implementation of the interconnection network.

Clock gating: to minimize power consumption, each buffer in the switch is in power-down mode by default, only if it has to accept new data, the clock is switched on. A power gain of more than 10% is achieved by means of this rather simple optimisation, as shown in FIG. 30.

Figure 31:
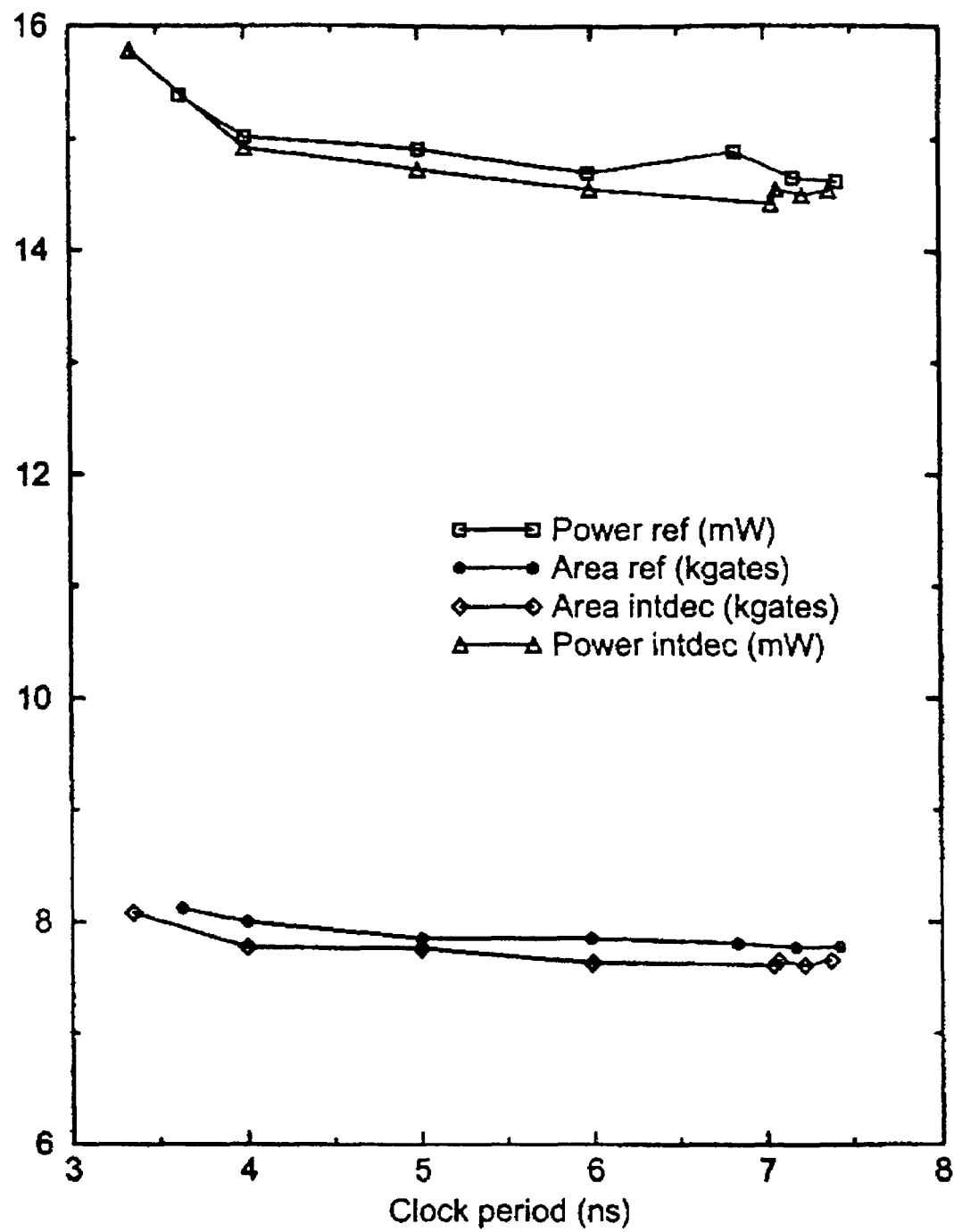
FIG. 31 graphically shows changing power and area consumption when coding/decoding packet types in an intelligent way.

More intelligent packet type decoding. Five types of packet are currently defined (Data, HeadOfPacket (HOP), HeadOfMessage (HOM), EndOfPacket (EOP) and EndOfMessage (EOM)). Since the HOP and HOM packet type request identical functionality from the switch, and EOP and EOM too, it is possible to decode the types in a way to make the decoding easier. It turns out that the power saving is marginal, as shown in FIG. 31, but the performance is increased to 300 MHz.

Figure 32:
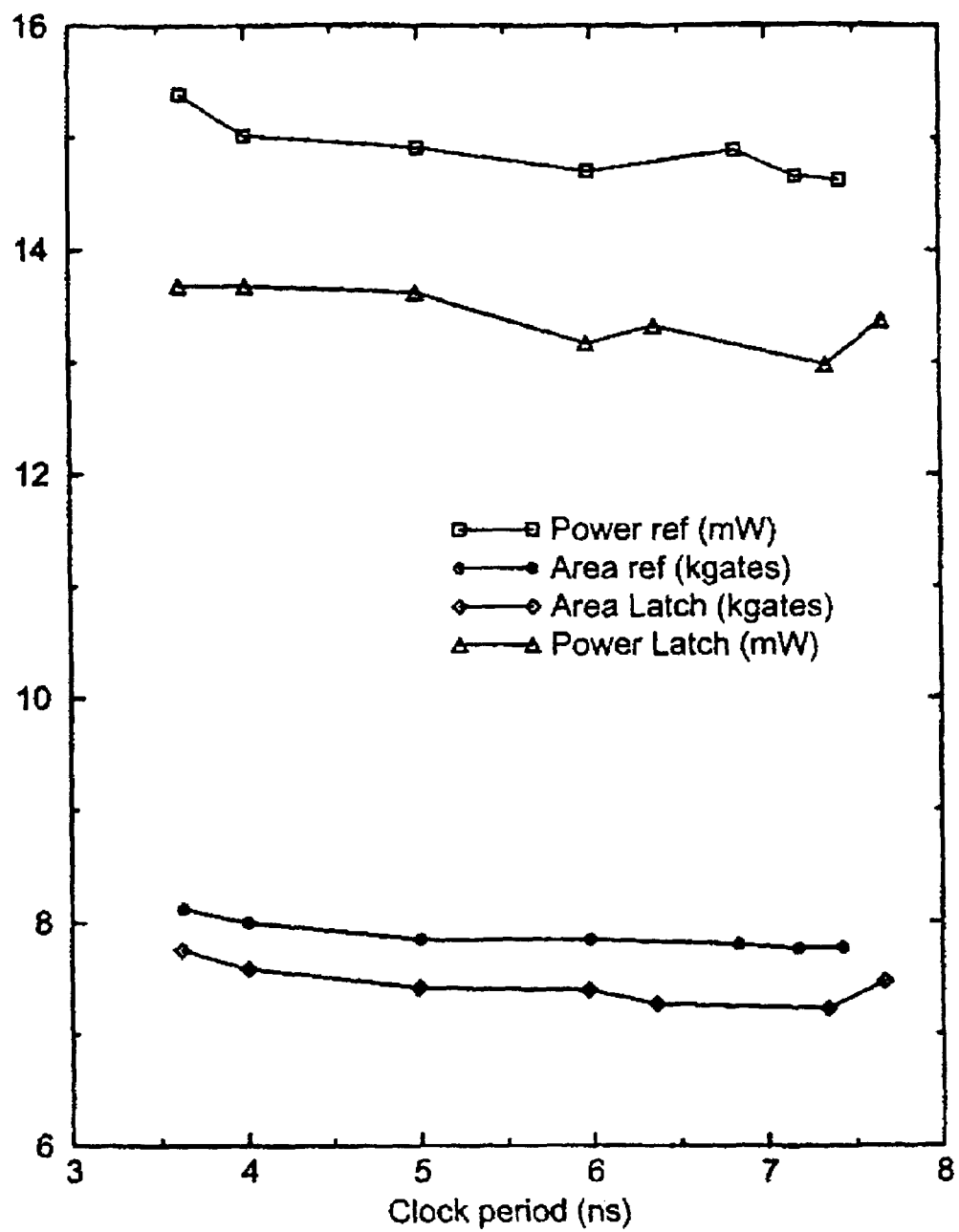
FIG. 32 graphically shows changing power and area consumption when using latches instead of flip-flops where possible.

Replace input buffer flip-flops by latches. The routing/transfer mechanism that uses both edges of the clock, makes is possible to replace the input buffer flip-flops by latches without difficulties. There is an improvement in both area (6%) and power (9%), as shown in FIG. 32.

In one aspect of the present invention a new interconnection network has thus been developed. Simulations show excellent results. Various options have been identified to improve the network.

CPPA Synthesis

Figure 33:
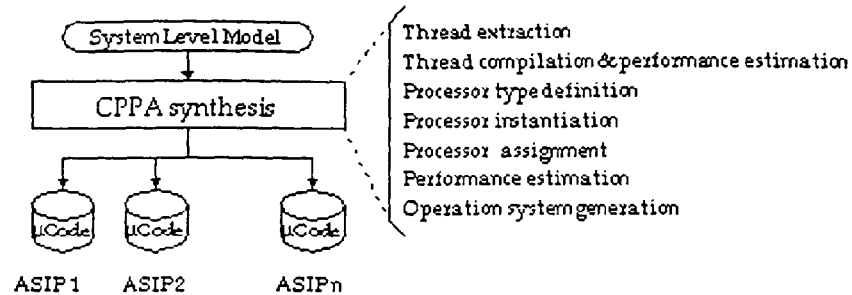
FIG. 33 is a schematic representation of CPPA synthesis.

An embodiment of the present invention involves CPPA synthesis which is the process of mapping a system level model on a CPPA architecture in accordance with the present invention. The synthesis process takes as input a system level model, which is a collection of concurrent threads, and generates the micro-code for a set of Application Specific Instruction set Processors (ASIP) as represented in FIG. 33, such that:

The coordinated execution of the micro-code generates results that are consistent with the system level model.

The real-time constraints are met.

The cost (in terms of silicon area and power consumption) is minimized.

CPPA synthesis encompasses the following synthesis tasks:

Thread extraction: A system level model is described as a set of concurrent processes that communicate through communication primitives (such as signals, queues, or containers). A process can contain other processes or is a primitive processor, whose behavior is defined by a thread (an evaluate function). Thread extraction is equivalent to removing the hierarchy in a system level model and constructing the set of threads that execute the behavior of the system level model.

Processor type definition & instantiation: a processor has an instruction set that can be extended with special purpose instructions. Each set of extension defines a processor type. Processor type definition and allocation is the task of determining the appropriate set of processor types and the appropriate number of instances of these processors types.

Thread compilation & performance estimation: Thread compilation refers to the task of translating the programs in the relevant programming language such as C/C++ that define the behavior of the threads into micro-code for each of processor types. Performance estimates are generated for execution of the micro-code.

Processor assignment: is the task of assigning a thread to a processor.

Performance estimation: Processor assignment determines how the computational load is distributed over the set of processors and, therefore, it determines to a large extent the overall performance. Performance estimation is the task of estimating the overall performance of a given processor assignment.

OS generation: several threads can be assigned to a single processor. Each processor has to be able to deal with multiple threads. For that purpose, each processor runs a custom operating system that handles the execution of the multiple threads on a single CPU.

Thread Extraction

A system level model is described as a set of concurrent processes that communicate through communication primitives (such as signals, queues, or containers). A process can contain other processes or is a primitive processor, whose behavior is defined by a thread (the evaluate function). Thread extraction is equivalent to removing the hierarchy in a system level model and constructing the set of threads that execute the behavior of the system level model.

Care must be taken that the state that is associated with each thread is handled properly. In that respect, this task resembles some of the front-end tasks of a C++ compiler. Thread extraction is a known problem for which solutions exist. Thread extraction may be a manual task.

Processor Type Definition & Instantiation

A processor has an instruction set that can be extended with special purpose instructions. Each set of extension defines a processor type. Processor type definition and allocation is the task of determining the appropriate set of processor types and the appropriate number of instances of these processors types.

Processor type definition and instantiation are tasks that are not easily automated. Of all tasks in the design flow, the leverage of designer experience and creativity in type definition is the highest. For that purpose, processor type definition and instantiation are preferably user driven, with estimation tools in the design flow that guide the user in the decision making process.

Thread Compilation & Performance Estimation

Thread compilation refers to the task of translating the programs e.g. C/C++ programs that define the behavior of the threads into micro-code for each of the processor types. Performance estimates are generated for execution of the micro-code.

Thread compilation for various target CPU architectures is available from Target Technologies, e.g. the Chess compiler. A tool that has been recently developed by Target in the "Vlaamsche Reuse" research project is Worst Case Execution Time analysis (WCET). An extension of this tool gives for a specific micro-code file, a list of pairs (Signal, nr_cycles), where nr_cycles is the worst case execution time (in number of clock cycles) of the micro-code, if the thread, corresponding to the micro-code is triggered by Signal.

The average execution time could be used instead of the worst case.

Processor Assignment and Overall Performance Estimation

Processor assignment determines how the computational load is distributed over the set of processors and, therefore, it determines to a large extent the overall performance. Performance estimation is the task of estimating the overall performance of a given processor assignment.

Assignment and estimation are two tasks that are closely linked. According to a first embodiment of the design tools, processor assignment can be determined by the user. Performance estimation of a particular assignment will then enable the user to improve the assignment.

According to a second embodiment of the design tools, an automated tool proposes an initial processor assignment, which can be further improved by the user based on feedback from the performance estimation.

Figure 34:
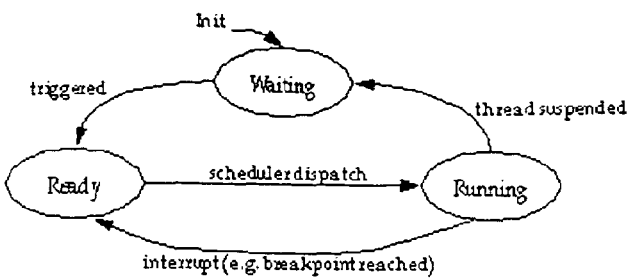
FIG. 34 illustrates different possible states of a thread.

Automated thread assignment and performance estimation are based on a number concepts that are defined below:

Thread state: While an application is running on a CPPA architecture, each thread may be in one of the following states, as shown in FIG. 34:

Waiting: The thread is suspended and waiting to be triggered.

Running: Instructions are being executed.

Ready: The thread has been triggered and is waiting to be executed by the processor. Since many threads could be assigned to the same processor, a scheduler will select the next thread to be executed.

Figure 35:
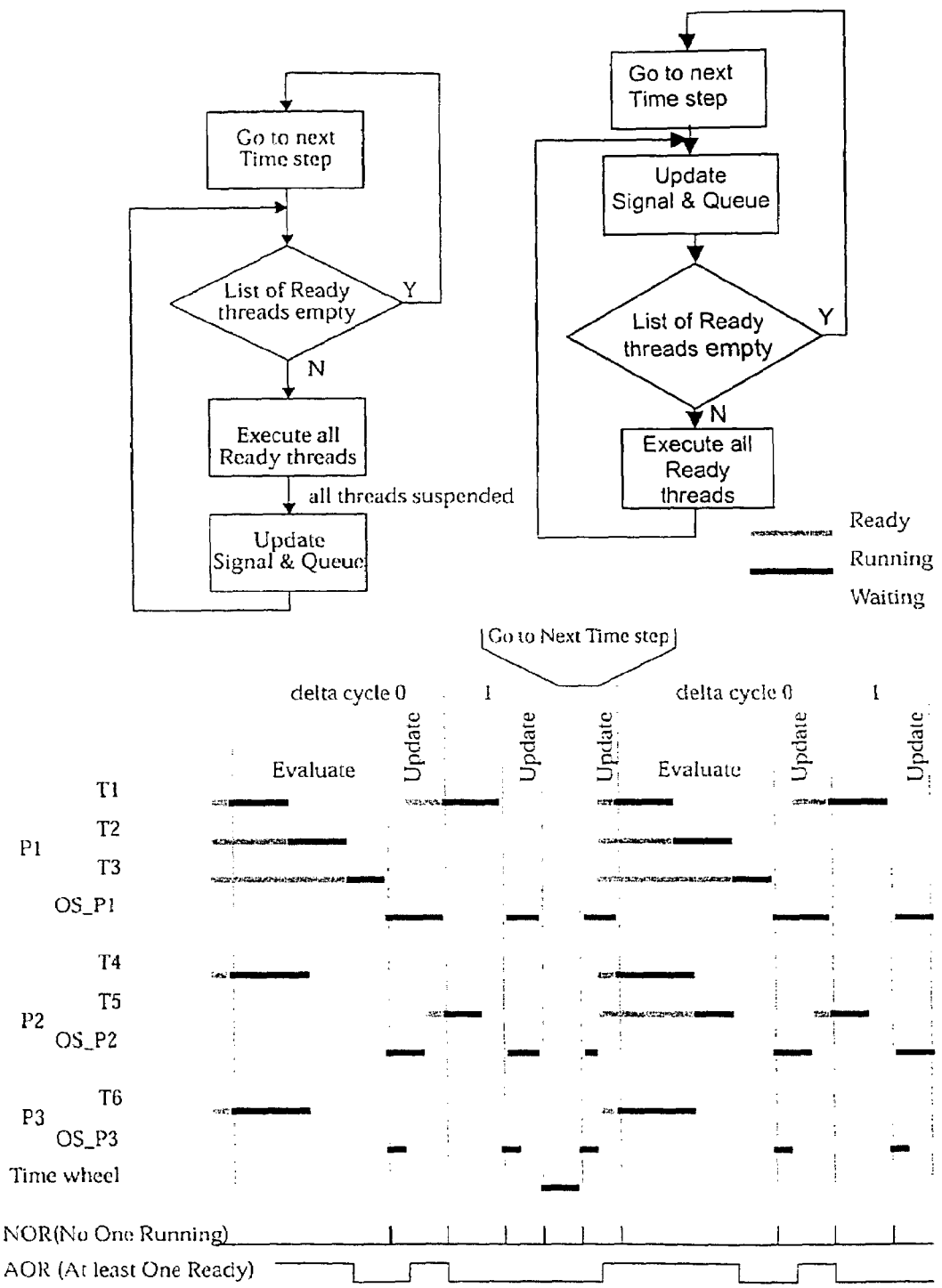
FIG. 35 illustrates thread activation, for an example with 6 threads assigned to 3 processors.

Thread activation: in accordance with an embodiment of the present invention threads are activated according to the delta cycle convergence algorithm. This guarantees that the implementation on the CPPA will give results that are consistent with the results of the simulation done with the simulation engine according to the present invention. In FIG. 35, an example with 6 threads is shown. These threads are assigned to 3 processors 4, called P1, P2 and P3. There is one special thread, called time wheel. The time wheel schedules the order of events. It computes at which point in time signal events are triggered. It is to be noted that time is a fictitious concept that may not relate to the actual elapse time of the execution. It only determines the sequence of events, not the amount of time it takes to compute the actions related to that event.

Figure 36:
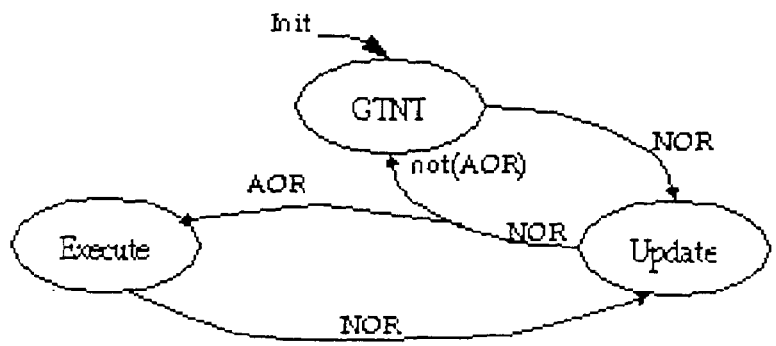
FIG. 36 illustrates different states of the operating system of the processors.

To execute the algorithm on the CPPA architecture, each processor contains a custom (micro) operating systems (OS) that has three states, as shown in FIG. 36, and in the flow chart of the upper right part of FIG. 35:

Go_To_Next_Time: If the processor contains the Time wheel, it is executed. After completion, the OS goes to the Update state. If the process does not contain the Time wheel, it polls the NOR (no one running) flag. After the flag is asserted (when the Time wheel has completed), it goes to the Update state.

Update: All signals and queues are updated. This may change the state of threads from Waiting into Ready. Then activity is suspended until NOR is asserted (when Update threads of all processors have been completed). If the AOR (At least one ready—OR) signal is asserted, it goes to the Evaluate state, else it goes to the Go_To_Next_Time state.

Evaluate: The OS (operating system of the relevant processor 4) selects the next thread from the list of Ready threads and executes it. If the Ready list is empty and the NOR flag is asserted (all Execute states have been properly handled), it goes to the Update state.

The upper left part of FIG. 35 illustrates an alternative embodiment of a flow chart showing a different succession of the three states of the operating system. In that case, and update step is implicitly available in "Go to next time step".

Sensitivity graph: The sensitivity graph is a graph with:

Vertices representing threads.

Directed edges between $T_i$ and $T_j$ representing the fact that $T_j$ is sensitive to a signal or a queue that is driven by $T_i$. It is to be noted that a signal can only be driven by one thread. An edge has a pair of weights ($W_{ij}$, $A_{ij}$) representing the worst case and average execution time of the thread $T_j$ in case it is triggered by an event of a signal driven by $T_i$.

If the sensitivity graph is cycle-free, the delta cycle convergence algorithm converges to a state that is independent of the order in which the threads are scheduled. If the sensitivity graph contains cycles, it is possible that the algorithm hangs in an infinite loop.

A graph without loops can be leveled.

It is assumed that there is only one thread without a sensitivity list: the Time wheel thread. This thread is the primary source of events and determines the order in which events take place during the execution of the application.

The depth of the graph (=the number of levels) determines the maximal number of delta cycles that are required to converge. In the example graph of FIG. 35, schematically represented in FIG. 37, 3 delta cycles are required:

Delta cycle 1: executes the Time Wheel thread (TW)

Delta cycle 2: executes T1 to T6, except T5

Delta cycle 3: executes T1 and T5

It is to be observed that T1 is executed twice. In some cases, this may be redundant. For example, if T1 doesn't contain any state, it would be sufficient to execute T1 only in delta cycle 3 and obtain the same result. In the general case however, T1 must be triggered in delta cycle 2 and 3.

The sensitivity graph limits the available parallelism. For example, T5 can only be executed after T6 has been completed.

Communication graph: The communication graph is a graph with:
Vertices representing threads.
Directed edges between $T_i$ and $T_j$ representing the fact that two threads communicate via a signal/queue/container. Each edge has a weight that represents the cost of communication in terms of bandwidth (e.g. in case a signal is used to communicate, the weight on the edge may be equal to the number of bits required to represent the value of the signal).

Each thread stores in local memory the current state of its input signals and queues, and the new state of its output signals and the entry queue of its output queues. During the Update state, the new states will replace the current state. If the communicating threads are located on the same processor, this involves a local memory transfer with cost $U_{int}$. If the communicating threads are located on different processors, this involves an inter-processor communication with cost $U_{ext}$.

Figure 37:
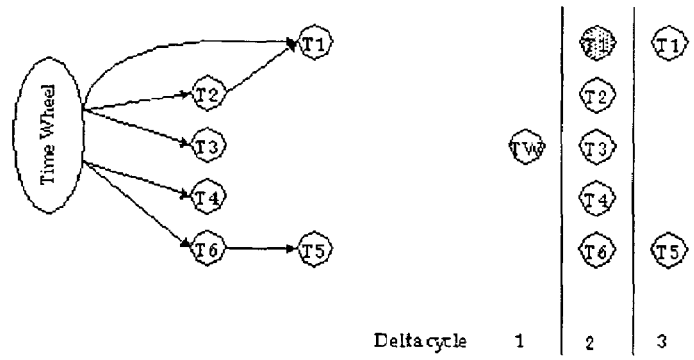
FIG. 37 is a schematic representation of the delta cycles of FIG. 35.

The sensitivity graph, as shown on the left hand of FIG. 37, is often a sub-graph of the communication graph. However, it is possible that a signal is only a member of the sensitivity list and that its value is never used (e.g. a sample tick signal that determines the sample rate processing in a discrete time system).

Sensitivity and communication graph construction: The simulation engine according to the present invention builds the sensitivity and communication information of a system description during the construction phase. The sensitivity graph and communication graph could therefore by constructed by the simulation engine system level development environment.

It is to be noted that in case WAIT statements are used, there is no explicit declaration of sensitivity. Therefore, the sensitivity lists cannot be generated at construction time. This problem can be circumvented temporarily by introducing a statement that declares the sensitivity of a thread with WAIT statement to a signal. During execution, it could be checked that the arguments of a WAIT statement are declared as part of the sensitivity list.

Processor Assignment

According to an embodiment, processor assignment is user defined by means of a graphical interface. Analysis tools based on the sensitivity and communication graph are used to give feedback to the user with respect to the quality of the assignment.

According to a further embodiment, automatic assignment provides the user with an initial solution. Automatic processor assignment is a process that tries to minimize the idle time of the processors. Since the delta cycles have to be processed sequentially, the optimization criterion can be formulated as follows: Given, $E_i^P$, the sum of the WCET of the threads assigned to process P in delta cycle i and. $M_i$ is the maximum $E_i^P$ over all processors, determine the assignment such that $\Sigma M_j$ over all delta cycles is minimized.

This optimization will minimize the total time necessary for all the execution states. To minimize the time required for the update states, the threads are allocated to processors, such that the sum of all cost items U is minimized: Given, $U_i^P$, the sum of U of all outgoing edges of the threads assigned to process P in delta cycle i and. $M_i$ is the maximum $U_i^P$ over all processors, determine the assignment such that $\Sigma M_i$ over all delta cycles is minimized.

By applying graph transformations, better solutions can be found:

Delta delay insertion: by insertion of delta delays, the processor load can be better balanced. For example, delaying T4 over 1 delta cycle will not change the result, but may improve processor balancing.

Thread grouping: A thread group is defined as a group of threads with the same sensitivity list. The threads in a thread group can be considered as a single thread that executes the sequence of threads in the group (the order is not relevant). The advantage of thread grouping is that the number of times that the scheduler is invoked is minimized.

Thread clustering: Optimization over delta cycle boundaries.

Thread splitting: Splitting a thread into more threads can also reduce the processor idle time. This is also an optimization over delta cycle boundaries that requires further study.

Process memory allocation: In principle, threads could exchange information through shared variables, if they are assigned to the same processor.

OS Generation

Based the input of the previous steps, a custom (micro) operating system of each processor 4 can be generated. This operating system takes care of the scheduling of the threads and the Update functionality. The custom operating system is generated e.g. in form of C code, that is compiled by a suitable compiler such as Chess.

The compiler in accordance with the present invention compiles application programs which are compatible with any of the implementations of delta cycle convergence described. That is the compiled program either contains instructions and commands for executing delta cycle convergence or produces a compiled program which is compatible with delta cycle convergence carried out in an alternative way (such as e.g. by means of a hardware scheduling unit).

CPPA Optimized for Delta Cycle Convergence

The delta cycle convergence procedure in accordance with the present invention and as shown in FIGS. 35 and 36 is carried out by programming processors 4.

Two types of communication between processors 4 can be distinguished:

Functional connections (signals) between threads. This type of communication is performed via the packet switched network 1 during the update phase.

Synchronization between processors. Synchronization is done by the NOR and the AOR flag as described in FIG. 35.

Synchronization Implementation

The NOR and AOR flags can be implemented in several ways. The only requirement is that they behave as follows:

NOR: Behaves as a logical AND gate, of which each processor controls one input. As long as a processor is running, it pulls its input low. When it finishes, it drives a one. By consequence, the NOR flag will go high when all processors drive a one, or all processors have finished a delta cycle.

AOR: Behaves as a logical OR gate, of which each processor controls one input. When a processor is ready (at least one thread has been triggered and will be executed in the next delta cycle; this can easily be evaluated during the update phase), it drives a one on its input. When none of the threads are triggered, it drives a zero. When there isn't any thread that has been triggered, the AOR signal will be zero. That is the trigger for the GTNT process to increment the time up to the next clock event. Note that the number of delta cycles between two time increments, is always less than or equal to the depth of the sensitivity graph. So one embodiment of the present invention is a scheduler in which the GTNT thread is triggered every N cycles, N being the depth of the sensitivity graph. In that case the AOR flag implementation is in fact an alarm that becomes active every N cycles. This embodiment does not require any communication between processors for AOR, but is sub-optimal, in the sense that more delta cycles will be executed than absolutely necessary.

Straight Forward AND/OR

The simplest and most straight forward implementation is an AND/OR gate, having as many inputs as there are processors, and of which the output is distributed to all processors. This is shown schematically in FIG. 43 although only one gate is shown for simplicities sake. In this figure an output from each processor 4 in a network 1 is lead to a suitable gate 40 and the output from the gate 40 is provided as an input to each processor 4. A disadvantage of this embodiment is the long wires and poor scalability especially when the number of processors becomes large.

Wired AND/OR

In accordance with a further embodiment of the present invention a wired gate is used. This is shown schematically in FIG. 44. In this case the gate is distributed over the processors 4. Each processor 4 has an output connected to gate of a switching means 42 such as a transistor and an input connected to a line which joins all of one main electrodes of the switching means to a resistor 44 and ground potential. The other main electrodes are joined to a voltage source.

This embodiment scales better than the previous one, although the number of 'inputs' may be limited, and it may become slow for large input counts since a resistor has to pull up/down a load.

'Emulated' wired AND/OR

Figure 45:
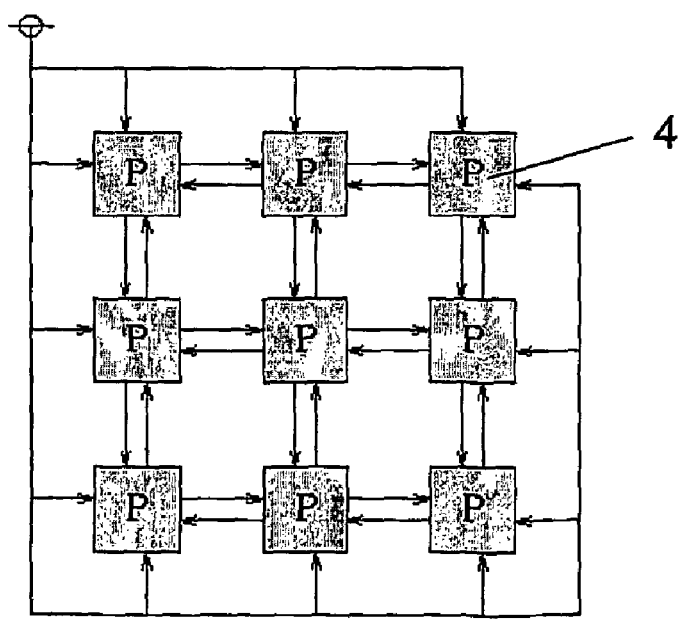

A wired AND or OR gate can be emulated in the way shown schematically in FIG. 45: provide 2 connections between each processor 4 and each of its 4 neighbors, one for each direction. Each processor evaluates the 4 inputs and drives its 4 outputs in the following way (for NOR):

1. East out is set when West in is set and the node is not running
2. West out is set when East in is set and the node is not running
3. North out is set when South in is set AND East in is set AND West in is set AND the node is not running
4. South out is set when North in is set AND East in is set AND West in is set AND the node is not running
5. NOR is set when the node is not running and all inputs are set.

In this way the whole system behaves as a wired AND. It takes a maximum of N+M cycles (where N and M are the dimensions of the processor matrix) to propagate a change to all processors. Although it takes multiple clock cycles for the signal to reach its destination, this implementation may be faster than the previous one, because it only uses short connections having a small load.

A similar implementation is possible for AOR.

An advantage of this implementation is that connections between processors 4 can be logically 'cut'. In that way a number of rectangular processor islands can be created, which have their own delta cycle system.

Figure 43:
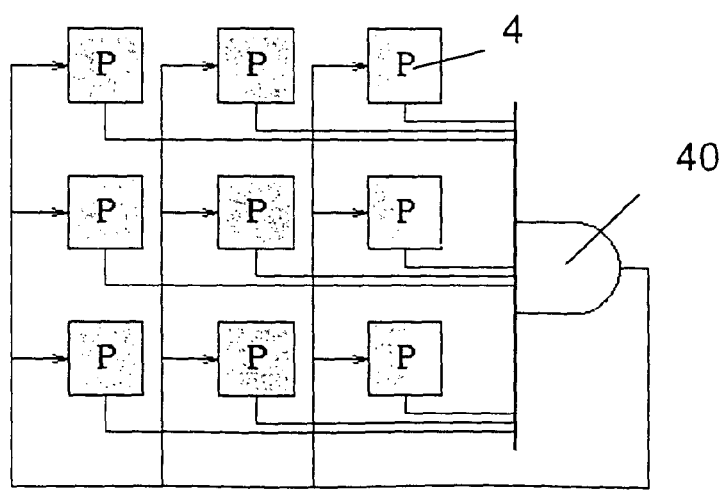
FIGS. 43 to 45 show three implementations of CPPA devices in accordance with embodiments of the present invention.
Figure 44:
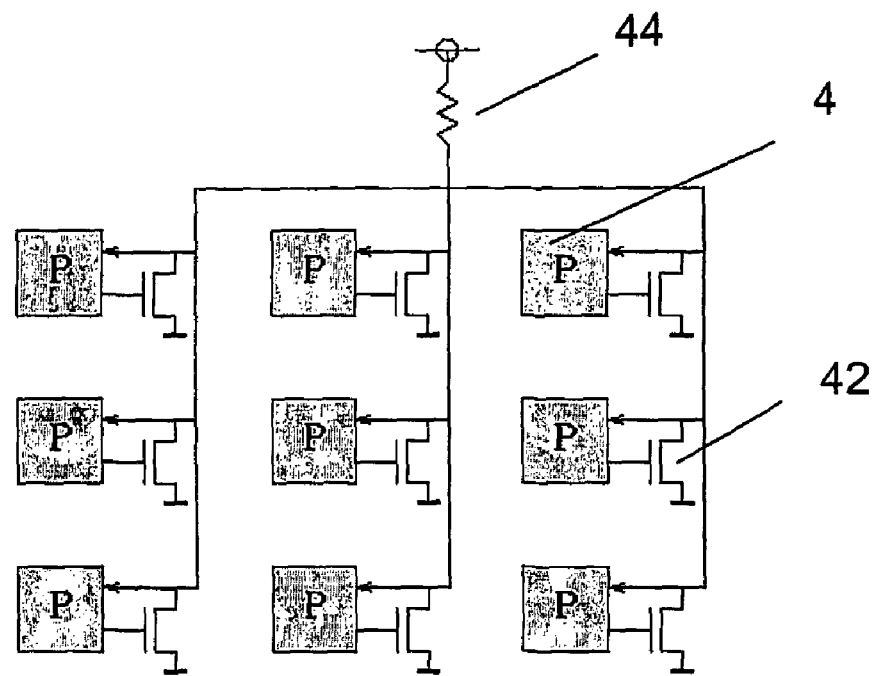

The embodiments of FIGS. 43 to 45 are hardware scheduling units.

Through the Switched Packet Network.

The processors 4 communicate with each other through the network to complete each cycle. For instance one of the processors 4 is a master processor. The master processor may run the time wheel thread and initiate a new time step but this is not essential. At the end of each delta cycle, each processor sends its status to the master processor. This processor waits until it received a message from all processors, decides what to do (go to the next delta or increment the time), and broadcasts a message back to all processors to start the next cycle. Similar to the previous one, this implementation has the possibility of having different independent delta cycle sub-systems within the network.

The delta cycle procedure in accordance with the present invention may be implemented on an array of programmable parallel processors in a variety of ways each of which is an embodiment of the present invention. The implementation may be in software running on the processors, a hardware scheduler which controls the operation of the processors or a hybrid software/hardware combination. A complete software embodiment can comprise a layer 3 application level solution, for example with one processor having the role of a master processor and the other processors being slave processors. The delta cycle convergence and the initiation of the next time step is controlled by the master processor communication with the slave processors in a layer 3 application program which runs on top of a TCP/IP stack and communications via the interconnection network. In order to determine the state of each processor the master processor may poll each slave processor intern. The present invention also includes controlling delta cycle convergence by modifying the operating system of each processor. For instance the operating system of each processor may include an interrupt routing which interrupts the operation of the processor until delta cycle convergence is detected. The modification to the operating system may include specific instructions in the instruction set of each processor to control the steps of the delta cycle convergence routine. The present invention also includes hardware control of delta cycle convergence. In this case a hardware scheduler senses the state of each processor and initiates a time set based on the results of the sensing step.

Independent of whether a software, a hardware or a hybrid solution is used for the implementation of delta cycle convergence the scheduling unit may be centralised or distributed with respect to the interconnection network. For instance, in a full software solution, instead of polling, a further time step may only be initiated when each processor has received an 'null token' from every processor in the network.

The present invention also includes that the network linking the processors has independent wiring for transfer of application data between the processors and for transfer of the signals required for controlling delta cycle convergence. Alternatively both convergence control and application data exchange may be carried out on the same physical network.

Although the present invention has mainly been described with respect to connecting the processor by a wiring layer, the present invention is not limited thereto. It includes connecting the processors by alternative communication systems such as an optical network, e.g. infrared, or a radio frequency communication system.

The compiler in accordance with the present invention compiles application programs which are compatible with any of the implementations of delta cycle convergence described above. That is the compiled program either contains instructions and commands for executing delta cycle convergence or produces a compiled program which is compatible with delta cycle convergence carried out in an alternative way.

CPPA Prototype

A prototype of the CPPA architecture has been created using an array of FPGAs.

CPPA Prototype Hardware

Figure 38:
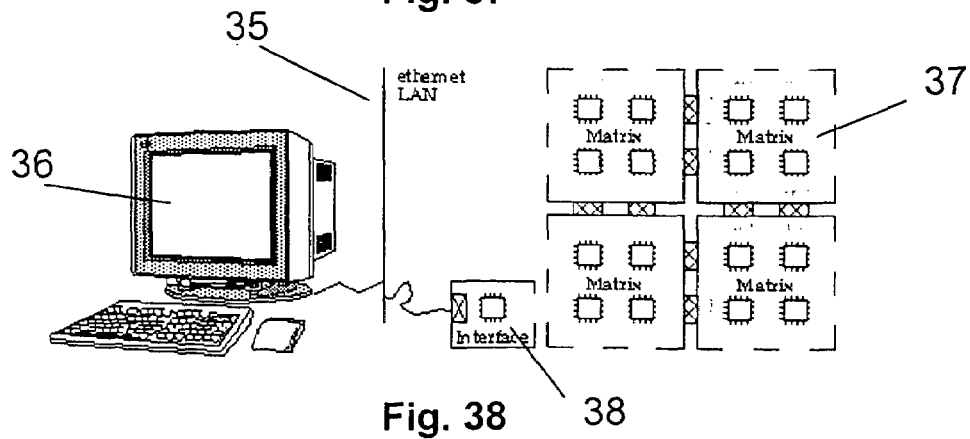
FIG. 38 illustrates a hardware architecture of a CPPA prototype.

The hardware architecture of the prototype is shown in FIG. 38. It comprises an Ethernet LAN 35 with at least one workstation 36 such as a UNIX workstation, an interface board 38 and a matrix board 37. The prototype has a modular architecture.

The interface board 38 is the link between the workstation 36 on the LAN 35 and the prototype. All communication (e.g. downloading of the FPGA configuration data, downloading of the micro-code, communication of debug info) between the prototype and the outside world goes through this link. The use of Ethernet has the advantage that the prototype can be connected to any LAN 35 and that, from the point of view of the users, the prototype is a server, just as any other workstation.

The interface board 38 also contains support hardware (e.g. clock generation).

The matrix board 37 contains a 2×2 array of processing elements. Each processing element contains a switch, a communication processor, program memory, data memory and a customizable RISC core. The processing elements are implemented with an FPGA (Xilinx-virtex 600), connected to off-chip RAMs for program and data storage. The matrix boards can be connected to each other to construct larger arrays. In theory there are no limits to the size of the array that can be constructed, but practical issues (e.g. the size, clock distribution and power dissipation) may set an upper bound.

The configuration of this prototype contains an interface board 38 and 4 matrix boards 37. It implements a CPPA architecture with (4×4) 16 processing elements. This prototype is tested, verified and is fully operational.

Alternatively, instead of the Ethernet LAN 35, a part of a WAN, such as the internet, could be used. For example FPGA configuration data or micro-code can then be downloaded from a remote station into the matrix board over the internet.

According to another embodiment, the above configuration could be customized into a portable device for field programming of arrays, having a port for connecting up to the matrix board.

In a further embodiment of the present invention a configuration program for configuring an array of programmable parallel processors is located on a remote processing engine such as a server to which access may be obtained by suitable means, e.g. a telecommunications network such as the Internet, an Intranet, a LAN, a WAN. The server comprises a processor and memory. A user wishing to use the program located on the server, enters a descriptor file at a near location, e.g. a computer terminal of a LAN or a PC, of a process to be run on an array in accordance with the present invention, which can access the telecommunications network. The descriptor file may be a high level language description of a computer program. The descriptor file is transmitted to the server via the Internet and the server operates on the descriptor file to generate a configuration file as described above. This configuration file is returned to the near location, via suitable means, e.g. fax, e-mail or directly via the Internet and can then be loaded onto a suitable array.

CPPA Prototype Software

Figure 39:
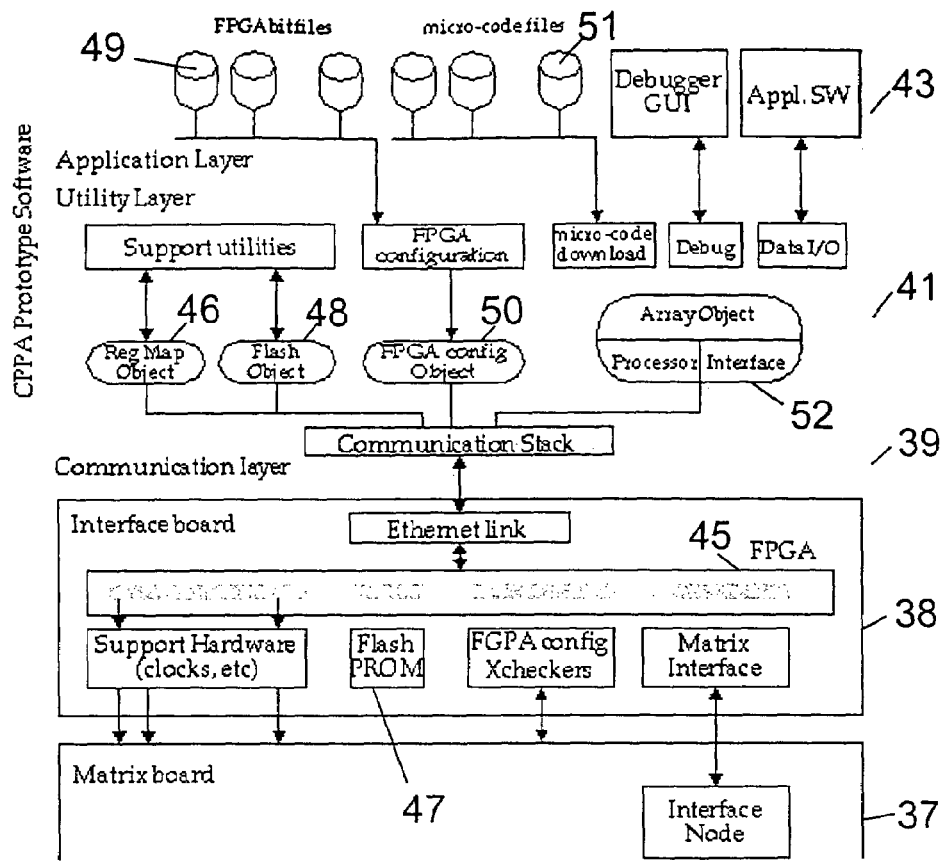
FIG. 39 illustrates the 3 layers of the CPPA prototype software.

The software that is used to drive the prototype is constructed in three layers, as shown in FIG. 39: a communication layer 39, a utility layer 41 and an application layer 43:

The communication layer 39 takes packets it receives from the utility layer 41 and sends it to an Ethernet port. Vice versa, packets received from the Ethernet port are delivered to the utility layer 41. The communication layer 39 implements a simplified version of the TCP/IP protocol stack.

The utility layer 41 contains 4 types of objects:

Register Map type objects 46: This type is an array of registers. These registers correspond to registers in an FPGA 45, located on the interface board 38. The registers are connected to various hardware support units, such as clock and reset generators. The Register Map type supports two methods: Get/tem and Set/tem. These methods generate packets that are transported over Ethernet and decoded by the FPGA on the interface board to get and set the value of the specified registers.

Flash EPROM type objects 48: This type is an array of registers that correspond to the content of an EPROM 47 that sits on the interface board 38. The EPROM 47 is used to store persistent info, such as the IP address of the interface board 38.

FPGA configuration type objects 50: The purpose of this type is to configure the FPGAs (not represented in FIG. 39) on the matrix boards 37.

Array type objects 52: There are two types of Array objects: Interface objects and Processor objects. An interface object is a special node in the matrix that is used to interface with the interface board 37. This node is basically a switch with a special version of the communication processor. The primary purpose of the interface node is to send/receive messages to/from the interconnection network. Processor objects correspond to a processing element in the matrix. Various methods are defined for processor objects (Run, Halt, SetDataMemory, GetDataMemory, SetProgramMemory, GetProgramMemory, etc.). Each of these methods is implemented by means of Set/Get message calls to the interface objects that is used to communicate with the processing element.

Using these four object types, several utilities have been constructed:

Support Utilities
FPGA configuration utility
Micro-code download utility
Debug utility
Data I/O utility An application layer 43 calls upon the utility layer 41 to implement specific applications, such as a Debugger GUI or a 4-on-a-row game. For a start, FPGA bitfiles 49 are used to configure the FPGA's on the matrixboard 37 so as to implement the desired functions. Once the FPGA's on the matrixboard 37 are configured, micro-code files 50 are downloaded to bring the code to the processors of the matrixboard 37.

Versatile Programmable Processor Array (VPPA)

In accordance with a further embodiment of the present invention a CPPA is implemented as a combination of FPGA technology and ASIC technology in a single device, called a VPPA.

A VPPA is a device, based on the above CPPA architecture that is tuned for a range of applications in a specific application domain. The VPPA contains a CPPA array of a fixed dimension. Each of the Processing Elements contains a region, in FPGA technology, that can be used to customize the instruction set of the processing element. Moreover, the VPPA device contains at its boundary a region in FPGA technology for application specific interfaces.

VPPA devices are a response to the dynamics of the IC market in the coming years:

The dramatic increase in the capability of silicon VLSI pushes VLSI technology to devices with ever increasing complexity.

The reduction of product life cycles puts increasing emphasis on time-to-market.

Shortage in design capacity and the exploding NRE costs limit the number of design starts.

Price erosion emphasizes the importance of product differentiation

ASIC technology provides excellent product differentiation but suffers from time-to-market constraints and design start problems, ASSPs (Application-Specific Standard Parts) address the time-to-market issue, but lack sufficient product differentiation, while FPGAs cannot deal adequately with the increasing complexity of systems.

VPPAs are off-the-shelf component embodiments in accordance with the present invention that can handle the complexity of SoCs and have the product differentiation capabilities of ASIC technology. They combine the advantages of ASICs, ASSPs and FPGAs. Table XI shows the strengths and weaknesses of different IC implementation styles.

TABLE XI

|  | ASIC | ASSP | FPGA | VPPA |
|---|---|---|---|---|
| Complexity | +++ | ++ | --- | ++ |
| Time to Market | --- | +++ | + | ++ |
| NRE cost | --- | +++ | + | ++ |
| Product differentiation | +++ | --- | + | ++ |

From Table XI, it can be seen that VPPAs can, in many respects, be considered as super FPGAs:

Compared to FPGAs, VPPA devices can handle a much higher complexity at the same cost. The reason is that, in VPPA devices, "inefficient" FPGA technology (the ratio of functional transistors over total transistors is 1/400 to 1/200) is only used for special purpose instructions and interfaces. For all other functions, efficient ASIC technology is used.

The time-to-market properties of VPPAs are better than FPGAs. The VPPA design process, based on synthesis of system level model, is much faster compared to the tedious cycle of RTL coding, logic synthesis, FPGA place&route, timing estimations, etc.

The NRE cost of FPGA and VPPA is the cost of design (there are no mask costs involved), Since the design of VPPA devices is simpler and quicker, the NRE cost of VPPA devices is lower than FPGA devices.

Product differentiation currently relies also on software. FPGAs cannot deal with functionality implemented in software, while VPPA are tuned for executing software.

Figure 40:
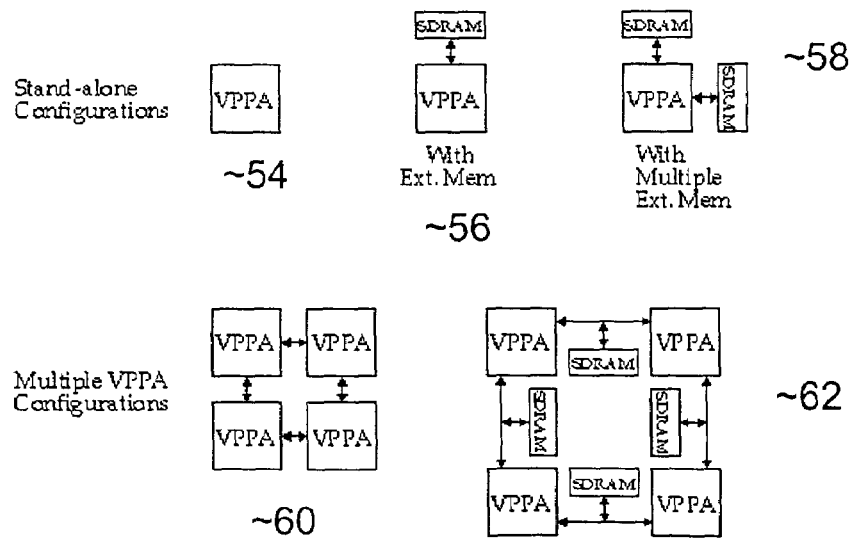
FIG. 40 illustrates various configurations of a VPPA.

VPPAs can be used in various configurations, as shown in FIG. 40: there are stand-alone configurations, and multiple VPPA configurations in which a plurality of VPPAs are interconnected. In a first configuration 54, a single VPPA chip is used. In a second configuration 56, a single VPPA chip is extended with one external memory unit, SDRAM, which can be used when the internal memory of the processing elements in the VPPA is too small. In configuration 58, a single VPPA chip is extended with a plurality (two) of external memory units SDRAM. In a fourth configuration 60, four VPPAs are clustered to form a bigger cluster. In configuration 62, four VPPAs and four external memory units SDRAM are clustered. The external memory units can be connected in the 2-D structures in an analogous way as the VPPAs. VPPAs can be addressed by a set of (x, y)-coordinates according to their positions in the cluster, and the external memories can be addressed the same way.

The configurations are supported by a special SDRAM interface, located at each of the 4 sides of the VPPA device. This interface is designed such that it can be used at the same time to connect VPPA devices back-to-back.

Figure 41:
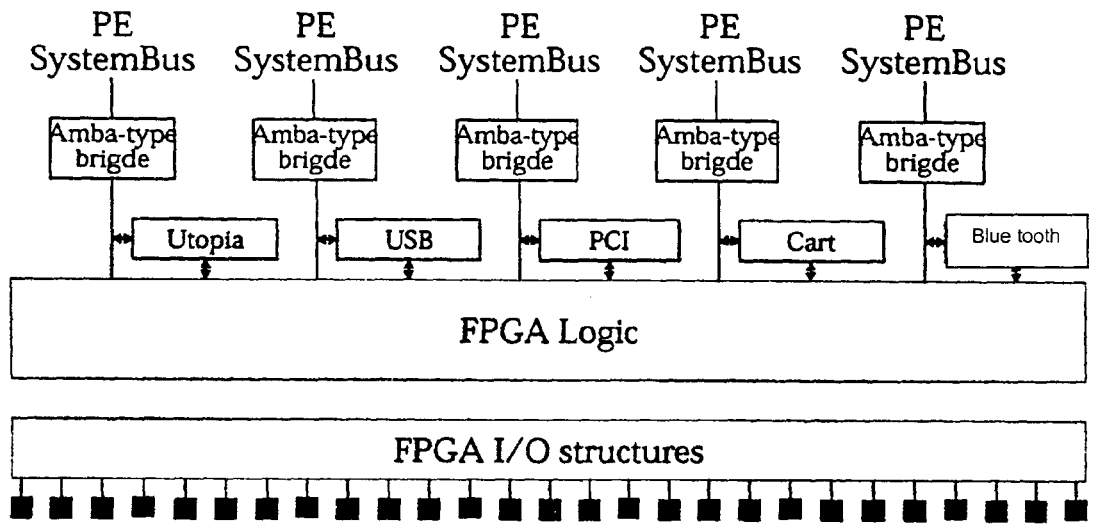
FIG. 41 shows an interface at one of the sides of a VPPA device.

The sides of the VPPA device that are not used for connections to an external memory or another VPPA device can be configured to implement dedicated interface protocols. VPPAs with a dedicated application domain, can include standard interfaces that are commonly used in that application domain. These standard interfaces (such as PCI, Utopia, USB, Smart Card, UART, HDLC, Blue tooth) can be included by default, because they are very small anyway and do not have a significant impact on the overall cost. An interface at one of the sides may look as shown in FIG. 41.

Figure 42:
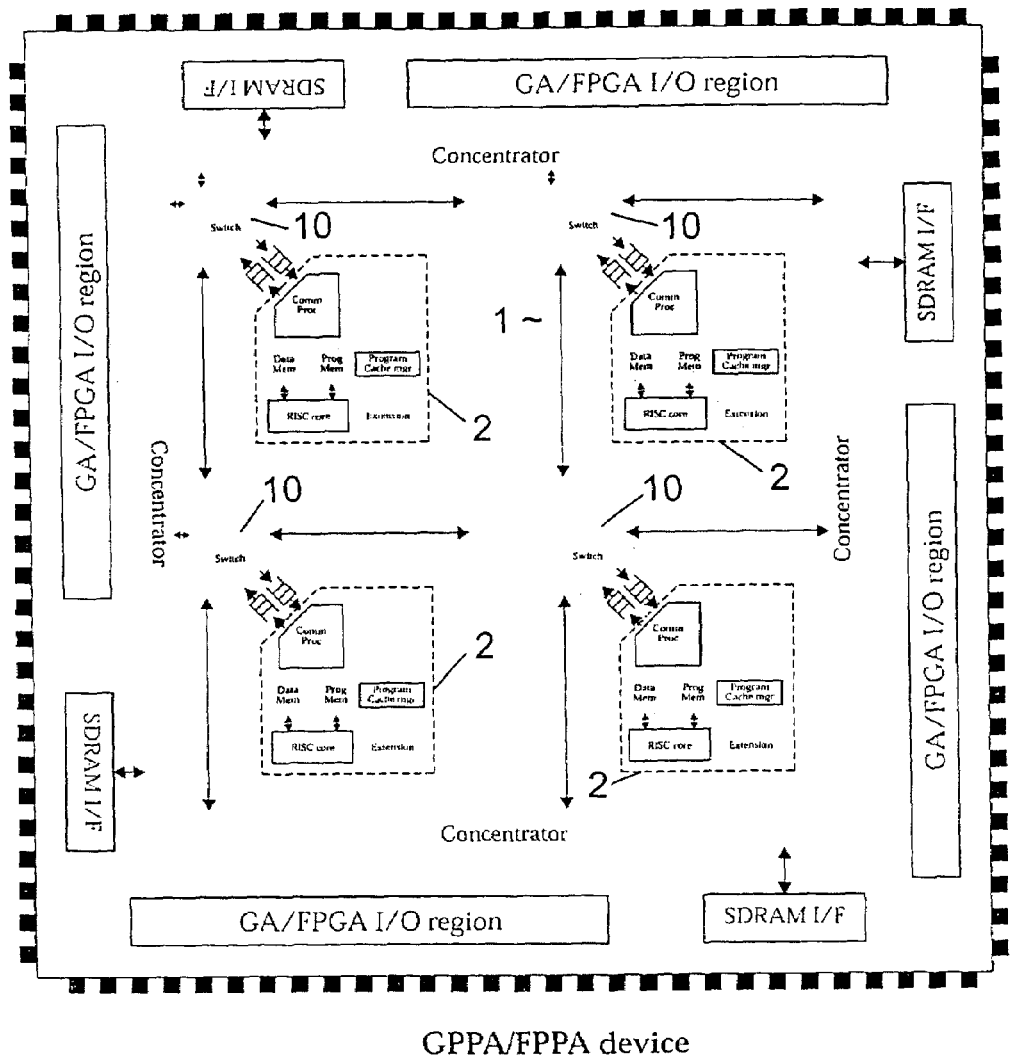
FIG. 42 shows a completed VPPA device.

A completed device could then be as shown in FIG. 42. This shows four nodes 2 coupled together through switches 10 and an interconnecting network 1. At the sides of the device that are not used for connections to an other node 2, a concentrator is provided for concentrating signals from the nodes 2 towards an SDRAM interface (external memory) or towards standard interfaces as shown in FIG. 41.

While the invention has been shown and described with reference to preferred embodiments, it will be understood by those skilled in the art that various changes or modifications in form and detail may be made without departing from the scope and spirit of this invention.

The invention claimed is:

1. An apparatus comprising:
an array of parallel programmable processing engines;
a switching network interconnecting the array of parallel programmable processing engines, wherein at least some of the processing engines execute a thread, at least some threads communicating with each other through communication objects either internally within one processing engine or through the network, the array of parallel programmable processing engines include means for scheduling a scheduling step of the parallel programmable processing engines, the scheduling step being initiated by one or more events, an event being defined by a change of a state variable of a communication object, a scheduling step comprising a delta cycle convergence step, wherein
the array of parallel programmable processing engines executes a system level model, the system level model comprising a plurality of concurrent processes at least some of which communicate with each other, at least one of the processes being a further system model and each of the other processes being a primitive process, and wherein executing a thread on one of the processing engines of the array of parallel programmable processing engines executes a primitive process.

2. An apparatus according to claim 1, wherein:
the means for scheduling includes means for executing at least a first set of threads in parallel, and
the apparatus further includes means for updating state values of communication objects in response to the parallel executing step, and means for repeatedly and sequentially scheduling the means for executing and the means for updating until no more events occur.

3. The apparatus according to claim 2, wherein:
the programmable processing engines have at least one memory and the communication objects comprise a data structure of a mapping into memory of at least one of signals, containers and queues.

4. The apparatus according to claim 3, wherein:
the first set of threads comprises those threads that are sensitive to one or more events initiating the scheduling step.

5. The apparatus according to claim 4, wherein:
a queue is implemented as a FIFO memory.

6. The apparatus according to claim 5, further comprising:
a data structure in memory of the state values of the communication objects stored in memory for a number of scheduling steps.

7. The apparatus according to claim 6, wherein:
the system level model is a model of physical processes.

8. A deterministic method of operating an array of parallel programmable processing engines interconnected by a switching network, said method comprising:
at least some of the processing engines executing a thread,
at least some threads communicating with each other through communication objects either internally within one processing engine or through the network, initiating a scheduling step of the parallel programmable processing engines by one or more events, an event being defined by a change of a state variable of a communication object, wherein the scheduling step comprises a delta convergence cycle step, wherein
the array of parallel programmable processing engines executes a system level model, the system level model comprising a plurality of concurrent processes at least some of which communicate with each other, at least one of the processes being a further system model and each of the other processes being a primitive process, and wherein executing a thread on one of the array of parallel programmable processing engines executes a primitive process.

9. A method according to claim 8, wherein:
the delta cycle convergence step includes
(i) the parallel processing engines being scheduled so that at least a first set of threads are executed in parallel,
(ii) then state values of communication objects are updated, and
(iii) if an event occurs in steps (i) and (ii), steps (i) and (ii) are repeated until no more events occur.

10. The method according to claim 9, wherein:
the threads communicate through signals and/or queues and/or containers.

11. The method according to claim 10, wherein:
the programmable processing engines have at least one memory, the method further comprising: mapping into memory at least one of signals, containers and queues.

12. The method according to claim 11, wherein:
the first set of threads comprises those threads that are sensitive to one or more events initiating the scheduling step.

13. The method according to claim 12, wherein:
the state values of the communications objects are stored in memory for a number of scheduling steps.

14. The method according to claim 13, wherein:
the system level model is a model of physical processes.

15. A compiler for receiving a high level description of a computer program and for generating a compiled file for loading onto an array of parallel programmable processing engines interconnected by a switching network, wherein the compiler generates the configuration file such that when configured the array operates in accordance with the method of claim 8.

* * * * *